United States Patent
Blake et al.

(10) Patent No.: US 11,409,801 B2
(45) Date of Patent: *Aug. 9, 2022

(54) SYSTEMS AND METHODS FOR UPDATING SEARCH RESULTS BASED ON A CONVERSATION

(71) Applicant: Rovi Guides, Inc., San Jose, CA (US)

(72) Inventors: John Blake, Belmont, CA (US); Paul Stathacopoulos, San Carlos, CA (US); William L. Thomas, Evergreen, CO (US)

(73) Assignee: ROVI GUIDES, INC., San Jose, CA (US)

(*) Notice: Subject to any disclaimer, the term of this patent is extended or adjusted under 35 U.S.C. 154(b) by 134 days.

This patent is subject to a terminal disclaimer.

(21) Appl. No.: 16/839,303

(22) Filed: Apr. 3, 2020

(65) Prior Publication Data

US 2020/0250236 A1 Aug. 6, 2020

Related U.S. Application Data

(63) Continuation of application No. 15/960,982, filed on Apr. 24, 2018, now Pat. No. 10,650,054.

(51) Int. Cl.
*G06F 16/9032* (2019.01)
*G06F 16/907* (2019.01)
*G06F 16/332* (2019.01)
*G06F 16/33* (2019.01)
*G06F 16/9038* (2019.01)

(52) U.S. Cl.
CPC .... *G06F 16/90332* (2019.01); *G06F 16/3328* (2019.01); *G06F 16/3334* (2019.01); *G06F 16/3344* (2019.01); *G06F 16/907* (2019.01); *G06F 16/9038* (2019.01)

(58) Field of Classification Search
CPC ............. G06F 16/90332; G06F 16/907; G06F 16/3328; G06F 16/3334; G06F 16/3344; G06F 16/9038
USPC ........................................................ 707/706
See application file for complete search history.

(56) References Cited

U.S. PATENT DOCUMENTS

| | | | |
|---|---|---|---|
| 9,749,699 B2* | 8/2017 | Lee ..................... | H04N 21/4755 |
| 2014/0379456 A1* | 12/2014 | Miller ................ | G06Q 30/0247 705/14.41 |
| 2015/0143409 A1* | 5/2015 | Maughan ............. | H04N 21/262 725/34 |

(Continued)

OTHER PUBLICATIONS

Habibi, Maryam, et al., "Keyword Extraction and Clustering for Document Recommendation in Conversations", IEEE/ACM Transactions on Audio, Speech, and Language Processing, vol. 23, No. 4, Apr. 2015, pp. 746-759.*

(Continued)

*Primary Examiner* — Robert Stevens
(74) *Attorney, Agent, or Firm* — Haley Guiliano LLP

(57) ABSTRACT

Systems and methods are described herein for updating search results based on a user's comment or a conversation among users using a media guidance application. A set of search results may be presented to a user or users. Comments or a conversation about the search results may be analyzed by the media guidance application. Selected comments by a user determined to have a greater weight may be used to update the search results.

20 Claims, 12 Drawing Sheets

(56) References Cited

U.S. PATENT DOCUMENTS

2016/0094874 A1* 3/2016 Venkataraman ... H04N 21/4223
                                                          725/10
2018/0124438 A1* 5/2018 Barnett ............. H04N 21/4826

OTHER PUBLICATIONS

Shiga, Sosuke, et al., "Modelling Information Needs in Collaborative Search Conversations", SIGIR '17, Shinjuku, Tokyo, Japan, Aug. 7-11, 2017, pp. 715-724.*

Liu, Jingjing, et al., "A Conversational Movie Search System Based on Conditional Random Fields", INTERSPEECH 2012, Portland, OR, Sep. 9-13, 2012, pp. 2454-2457.*

* cited by examiner

"James Bond Movies"

"Not Daniel Craig"

*"Not James Bond Again"* — 410
*"Yes James Bond"* — 415

*"Let's Binge Something"* — 510

600

- The Good Place — 622
- Arrested Development — 623
- Freaks and Geeks — 624
- The Mindy Project — 625
- Blackish — 626
- Unbreakable Kimmy Schmidt — 627

(620)

630
635 — 🖼 Binge Series ☑
635 — 🖼 Funny ☑    Back

"How about Something Funny" — 610

- Cheers — 722
- The Office — 723
- Girlfriends — 724
- Friends from College — 725
- 30 Rock — 726
- Grownish — 727

(720)

730  740  740  740
735 — 🖼 Binge Series ☑  🖼 Jason Bateman ☑  🖼 Ellie Kemper ☑
735 — 🖼 Funny ☑  🖼 Yara Shahidi ☑
740 — 🖼 Ted Danson ☑  🖼 Mindy Kaling ☑   Back 735  "I Like that Actor" — 710

FIG. 7

SYSTEMS AND METHODS FOR UPDATING SEARCH RESULTS BASED ON A CONVERSATION

CROSS-REFERENCE TO RELATED APPLICATIONS

This application is a continuation of U.S. patent application Ser. No. 15/960,982, filed Apr. 24, 2018. The disclosure of which is hereby incorporated by reference herein in its entirety.

BACKGROUND

Media may be accessed using a media guidance application. Requests for media may be made in many ways. As media viewers come to rely on personal home assistant devices for controlling household devices, viewers may begin seeking access to media through the same personal home assistant devices. In some scenarios, there may be multiple and overlapping requests that may be received at a personal home assistant device that can be difficult to decipher and prioritize. Providing suitable choices to a viewer in response to requests will improve a viewer's media viewing experience.

SUMMARY

Accordingly, systems and methods are described for facilitating a search for a media asset based on a conversation. In particular, the conversation may be based on search results and used to update the search results. When a viewer wishes to access a media asset, the viewer may request that a search for a suitable media asset be performed by a media guidance application. Generally speaking, such a search may be performed when a viewer has some sense of what he or she wants to find, or the viewer may request a recommendation that may be based on a viewer's viewing history, or some other basis. In these scenarios, the viewer may initiate a request for a media search using conventional techniques such as selecting media categories or entering search terms, etc. An initial set of search results may be presented to the viewer and the viewer may have some opinions about or reactions to the results. In some environments, a viewer may select a result and then access the media asset. In other scenarios, the viewer may request a further search based on some related or completely different criterion. In each of these situations, the viewer takes an affirmative step to either access media or perform another search. It would be helpful to the viewer, however, for the media guidance application to update the search results with additional or incremental information, particularly if there is more than one viewer and each has certain opinions about the search results. Updating the search results using all of the comments and opinions in a conversation may lead to results that are not interesting or relevant to the users because the opinions may differ. Interpreting and filtering the conversation and opinions by way of prioritizing a viewer and then selecting a prioritized viewer's comments for use in updating the search results may improve the quality of the results. Furthermore, prioritizing a viewer and integrating elements of a conversation and a user profile for the participants in the conversation may help fine tune media search results.

In an example, if a set of media search results are presented to two people, a conversation may ensue in which the people may discuss the relative merits of the results. A household assistant device may be activated to a listening mode and may be used to monitor the conversation and provide an update to the search results as the conversation occurs and develops, for example, iteratively, as the conversation continues. For example, a household assistant device, such as an Amazon Echo, a Google Home, an Apple HomePod or another assistant device, may be activated to be in a listening mode. The assistant device may be connected to a home network and in communication with other devices, such as a media guidance application, a computer or processor, that in combination may provide the functionality described herein, or any of the devices may be capable of providing the features and functionality described herein separately. A media viewer or viewers may initiate a search for media using the home assistant device or using a media guidance application and then be presented with search results. The viewers may review the results and may make some comments on the results which may be in the form of a conversation or statement that is captured and analyzed by the home assistant device and used as a basis for updating the search results. In some scenarios, only one viewer may have comments about the results and the comments of the viewer may be used to update the search results using speech recognition and speech-to-text techniques to obtain text terms via the home assistant device for the media guidance application to update the search results. If there is more than one viewer seeking to access media the results may be discussed between the viewers and a conversation about the results may be captured by the home assistant device and used as a basis for updating the search results.

When there is more than one viewer discussing search results, the conversation and comments can be confusing to analyze when the media guidance application needs to harmonize comments that may conflict or be unrelated. One way to improve the quality of the updated results is to prioritize viewers and the words spoken by the viewers. For example, a viewer that makes a statement, "you decide" may indicate that the other viewer's statements should be weighted relatively highly. In another example, one viewer may say, "it's my turn to decide," and that viewer's comments may be weighted more highly. In another example, one viewer may state, "there is no way that I'm watching that again," and then a second viewer may state, "but you got to pick last time," and so the second viewer's comments may be weighted more highly. These examples are illustrative and are meant to show that conversations between viewers may indicate that one person's comments should be given more weight in order to provide improved and more relevant search results. The results can be updated iteratively using words from the viewers' conversations as the conversation continues in response to the results and following versions of the updated results. As the conversation continues, the media guidance application may detect that priorities or deference among the viewers may change and so the prioritization and weighting of comments by certain users can change. In addition, the comments can be associated with certain users and information about the users, such as viewing history and preferences, may be used to further improve the search results. For example, if one viewer's comments are prioritized in a search, the other viewer's viewing history and preferences may be used to rank and fine tune the search results to appeal to both viewers. To remove one viewer's comments or contributions in a conversation, when the other viewer's comments are taking priority in the conversation, the home assistant device may identify each viewer's voice using voice recognition techniques. The viewer's identity and comments and search contributions may be cached in storage by the media guidance application which will update the bases for the search. In some scenarios, certain voice commands may be used to select a viewer's comments for the search. In other scenarios, the media guidance application will prioritize viewer's comments to use for a search. In some scenarios, only one viewer may be speaking and commenting on search results. Such viewer's comments may be used by the media guidance application to update search results. The comments by the one viewer may be indicated on a screen to show keywords spoken by the viewer that may be used by the media guidance application to update the search results and which the media guidance application will use to generate updated screens of search results. Such keywords may be shown in a display generated by the media guidance application with an icon representing the speaker so that the source of the keywords used in the updated search is visible. However, in some scenarios, the one viewer that is speaking may not be commenting on the search results, and so his or her comments may not be relevant to the search. In this scenario, the media guidance application may analyze the speaker's comments and determine that the terms are not relevant and thus, not perform any search updates. In another scenario, the speaker may be a child and may be commenting on the search results, however, there may be a family setting or parental control setting that may cause the media guidance application to analyze such comments by the child and weigh whether to apply the comments to update the search results.

In an example, modifying search results for a media asset based on a conversation between users may be provided by receiving a search request from a first user. The search request may be commissioned and performed in any suitable manner, for example, using an input to a media guidance application such as a selection using a keyboard or remote control, or using a voice input or another input. In response to receiving the search request, the media guidance application may present a set of initial search results. The initial search results may be presented in a display screen, for example, on a portable device, computer, television screen or another suitable screen. The search results may be shown with information about the search request so that the viewer or viewers can see a connection between search terms and results. As searches are iterated and refined, the search trail and results may be displayed so that the user can follow the search evolution. Following the display of the initial search results, the media guidance application may receive feedback about the search results that may be in the form of a conversation by viewers of the search results. The feedback may be obtained using, for example, a home assistant device or other listening device capable of detecting a conversation. In some scenarios, the viewers may initiate a listening mode for the device. In other scenarios, the device may always be listening and can be activated by hearing spoken words, for example. In another scenario, the media guidance application may initiate the home assistant device to listen for comments when the media guidance application generates a display of search results.

The media guidance application may receive the audio data for the conversation and analyze the conversation. For example, the media guidance application may analyze and parse the individual words in the conversation and identify information about the speakers, using for example, a voice profile, to obtain user profile and preference details. The media guidance application may adjust a first weight for the first user and a second weight for the second user based on the analyzed conversation. For example, the media guidance application may detect an instructive word that may indicate that one of the users should take priority in the conversation, and so the respective weight for that user may be increased. Conversely, the media guidance application may detect that a deferential word that may indicate that user should not be prioritized in the conversation, and so the respective weight for the user may be decreased. Some words may be detected that match one or both users' viewing histories and preferences. Weights may be determined for the users based on the conversation and used to prioritize words spoken by the users to use in a following search to fine tune the search results. The media guidance application may determine that the first weight is greater than the second weight and then select words that were spoken by the first user and not the second user in the conversation. (In an alternate example, the second weight could be determined to be higher than the first weight and so the words of the second user may be selected rather than the words of the first user.) The media guidance application may then use the selected words to update the search results by performing a further search using the selected words. Thus, the search results may be further refined using words spoken by a user that is prioritized by the media guidance application. The search results may be additionally refined using preference information for one or both of the viewers. In some scenarios, a lesser weighted user's comments may be included in a following search, but may be given a lesser weight or used as a minor focus of a following search. As the following search is performed, and further refined, the terms used for the search request may be displayed alongside the search results so that the viewers can track and follow a progression of the search. A user interface may be provided in which the user may make selections to alter the search. For example, an option to save a search or undo a search to go back to an earlier iteration, may be provided.

In another example, modifying search results for a media asset based on a conversation between users may be provided by receiving a search request from a first user. The search request may be initiated and performed in any suitable manner, for example, using an input to a media guidance application such as a selection using a keyboard or remote control, or using a voice input or another input. In response to receiving the search request, the media guidance application may search for a media asset in a media database. The media guidance application may then generate a first display of a set of the first search results. The first search results may be presented in a display screen, for example, on a portable device, computer, television screen or another suitable screen.

Following the display of the first search results, the media guidance application may detect a conversation by the first user and a second user. The conversation may be detected using a listening device such as a household assistant device or other microphone enabled device capable of capturing audio data. In some scenarios, the users may initiate a listening mode for the listening device. In other scenarios, the device may always be listening and can be activated by hearing spoken words, for example. For example, the device may listen to determine whether the conversation is relevant to the search before activating the features described herein.

In some scenarios, there may be one speaker that comments on the search results in response to a display of search results generated by the media guidance application. When one speaker makes comments about the search results, the home assistant device may use speech-to-text analysis to convert the speaker's comments to text and then send the text to the media guidance application. The media guidance application may analyze the text terms for use in updating the search results. Such terms may be analyzed by the media guidance application to determine relevance and suitability for updating the search results. The media guidance application may also generate display screens showing the text terms used to update search results. A visual indication of the speaker or source of the text terms may also be shown alongside the text terms so that the viewer or viewers may see what terms are being captured and used by the media guidance application and how the comments may affect the search results. Options for selecting the terms, removing the terms, moving back and forth through the terms may also be supplied in the screen generated by the media guidance application.

When a conversation about the search results involves more than one speaker, the media guidance application may determine a first weight for the first user and a second weight for the second user. The weight determination may involve identifying the users using, for example, a voice profile and retrieving a weight associated with the identified respective user. In another example, the determined weight may be a default weight assigned to each user. In yet another example, the determined weights may be assigned based on the order or frequency that the users have interacted with the media guidance application, or based on a frequency that a user's search choices are selected in the media guidance application. In a situation where one user is initiating a search, the first user may have a higher weight given the first user's initiation of and request for the media search.

The media guidance application may analyze the conversation between the first user and the second user. For example, the media guidance application may receive audio data for the conversation and parse each of the spoken words to analyze the terms. In addition, each of the spoken words may be associated with a particular speaker. The association may be specific to an identified speaker, e.g., by matching a voice profile for the user, using a voice command identifying the speaker, or generalized to speaker one and speaker two, for example. When the user can be identified using a voice profile, the speaker's words may be compared against their viewing history to identify preferences and relevant comments. The words in the conversation are analyzed using linguistic analyzation techniques to determine, for example, instructions, parts of speech, names, definitions of terms, and other details about the conversation to determine whether a particular speaker or words spoken by a particular speaker indicate that the speaker should be prioritized. This analysis may be reflected by adjusting the first weight and the second weight for the respective users. For example, the media guidance application may detect an instructive word that may indicate that one of the users should take priority in the conversation and so the respective weight for that user may be increased. Conversely, the media guidance application may detect a deferential word that may indicate that the speaker should not be prioritized in the conversation, and so the respective weight for a user may be decreased. The media guidance application may determine which of the first weight and the second weight is greater and then select words that were spoken by the speaker having the higher respective weight. The media guidance application may then use the selected words to update the search results by performing a further search using the selected words. The media guidance application may also fine tune the search results using preference information for the users. For example, the search results may be presented in an order that may appeal to one or both of the users. When one user's weight is greater than the other user's weight, and a search is performed based on the comments of the user having the greater weight, the search results may be more appealing to both users if the results are refined with preference information for the other user. Thus, the search results may have prioritized one user's comments over another, yet still takes into account preferences for the other or both users. The search results may be displayed in a manner including search terms so that the viewers can see the evolution and track of search results and easily navigate back through the search trail. In addition, the viewers may select or remove certain terms in the search trail to further improve the search results.

In some examples, a media guidance application may determine a weight for the first user and the second user by comparing a voice pattern for the first user and/or the second user with a voice pattern profile database to identify the users based on a matching voice pattern. A weight for the identified user may be obtained based on a profile for the user. The profile for a user may also include preference details for the user. The preference information may be compared against words detected in the conversation and, in some examples, words that match a preference profile, may be a basis for increasing a respective users' weight so that the words matching the profile preferences, or other words, can be selected to improve the search results. For example, if one of the speakers in the conversation says, "I love comedies," and the word, "comedy" is determined to match the speaker's preference profile or viewing history, that speaker's weight may be increased.

In another example, words of a conversation may be parsed to determine a part of speech for the word. For example, if a pronoun is detected among the parsed words in the conversation, the media guidance application may determine which of the first user and the second user are associated with the pronoun. The user associated with the pronoun may have his or her respective weight adjusted based on the determination of association with the pronoun. For example, in a conversation where one speaker says, "you choose," the media guidance application may determine which of the speakers is associated with, "you" and adjust that speaker's respective weight.

In another example, a conversation between the first user and the second user may be analyzed so that each spoken word in the conversation may be compared with the terms of the first search results as well as metadata associated with the first search results. If there is a term among the results and results related metadata that is determined to match a word spoken in the conversation, the media guidance application may determine which of the users spoke the matching word and adjusting the respective weight for the speaker of the matching word. For example, in a set of results that includes several television shows, one of the users may say, "I love those old dramas." The media guidance application may search the search results and associated metadata to identify any that match a drama category or which have a relatively older release date.

In another illustrative example, a conversation between a first user and a second user may be parsed or analyzed to detect positive or negative words. For example, a home assistant device may be activated to listen to a conversation and analyze the conversation for relevance to search results. In another scenario, a media guidance application may initiate the home assistant device to listen for comments when the media guidance application generates a display of search results. The media guidance application may select a home assistant device to initiate based on the device proximity to a display of the search results, as well as proximity to the viewers. The media guidance application may initiate the home assistant device for a certain period, for example, five minutes, or for only a period in which the results are displayed in a screen in order to limit the device listening for comments that are related to the results.

The media guidance application may analyze the words heard by the home assistant device in the conversation to determine whether any of the words are positive or negative. For any words that are determined to be negative, the media guidance application may determine which of the users spoke the identified negative word and then adjust the speaker's weight, accordingly. In an example, a first user may state, in response to media search results, "I hate all of those movies." The media guidance application may determine the word, "hate" to be negative and assign a lesser weight to the first user since the first user's comments may not be helpful in providing an update or refinement to the search results list. In some scenarios, that first user's user preferences may be used to rank or select certain search results of a following search that is based on another person's comments so that the search results can be appealing to both persons. In another example, a second user may state, in response to the media search results, "I love that actor." In this example, the media guidance application may determine the word, "love" to be positive, and thus, the media guidance application may increase a weight for the second user. In addition, in this example, the media guidance application may determine the word, "actor" to be significant and related to the positive term and then update the search results with additional choices that include an actor associated with the first set of search results and actors that may match a user's viewing history. In some scenarios, the results which are updated with the actor comment, may be ranked in an order that takes into account actor preferences for the other speaker. In this way, both viewer's intents or wishes may be taken into account by performing an updated search for actors based on a first viewer's comment, and then the results are shown in an order that is based on the second viewer's viewing history, or preferences, in an effort to appeal to both viewers. A speaker of positive and negative terms may be identified by the media guidance application using a voice pattern profile, or designated as unidentified speakers one and two. If the latter, the media guidance application may temporarily store information about the speakers' voice patterns in order to adjust a speaker's weight and iterate the search results using compounding comments by respective speakers.

In another example, a media guidance application may update a media search and provide a display of a second set of search results that are based on a second search. The second search may be based on a conversation between two users about a first set of search results. A home assistant device may listen in on a conversation between the two users that occurs in response to the second set of search results. The conversation may be received by the media guidance application and words of the conversation may be analyzed by the media guidance application. The words of the conversation may be used as a basis for readjusting a respective weight associated with the first user and the second user. The results for the second search may be presented in an order that takes into account a preference profile for the first user and the second user. For example, if a first user's words are used to perform a search, they may be tailored to appeal to the second user by ranking the search results that are based on the first user's words with a ranking order that may appeal to the second user. In this way, the media guidance application can fine tune search results, as well as the order of the results, to appeal to both members of the conversation even when one person has a higher weight. This may allow the search results to be relevant and applicable to the wishes and intents of both viewers. A further third search for media assets may be performed by the media guidance application based on words in the conversation that are selected based on the readjusted respective weights. The third search may also be performed including parameters from the first search and the second search. In an illustrative example, a conversation about the second search results may include deferential, positive, negative, and/or instructive terms, which may result in an adjustment to a weight associated with each of the speakers. A following third search may then include selected terms by a speaker having a greater weight after the adjustment. Search results for the third search may be presented in an order or filtered using user preferences of one or both viewers in order to be relevant and interesting to both viewers. The search results may be displayed with its search trail so that the viewers can keep track of the direction of the search. The search results may be presented with options for adjusting the search, moving back and forth in the search trail, saving search results, and other options.

In another example, the third search may include terms in the conversation that are determined to be related to prior iterations of search results, or metadata for the prior search results. For example, a first user may say, "which James Bond actor do you like best?" The second user may respond with, "Roger Moore." Such a conversation may cause the media guidance application to identify the, "you" spoken by the first user as an indication of deference to the second user and determine that, "Roger Moore" is related to certain James Bond films. Weights for the first user and second user may be adjusted based on the deferential comment, and the media guidance application may select the actor, "Roger Moore" to include in a third search. In response to the updated search results, the first user may state, "Oh, I don't want to watch anything too old." The second user may respond, "Yah, me neither." The media guidance application may detect a deferential or agreeing comment by the second user based on his or her response and change the second user's weight. For the first user's comments, the media guidance application may detect the negative comment about old movies, and those terms may be selected to remove old movies from the prior search results. Such comments may be included in the display of the search results so that the viewer can see how the comments cause search results to be updated. In addition, the comments may be provided in a way that can allow the user to remove or select them to further refine the search. In an example, the weights of the users change as the conversation about the results continues which may cause different users to have his or her respective comments selected as instructive or prioritized feedback by the media guidance. In some scenarios, the following results may be ranked or selected based on the users' preference profile so that the results are fine tuned in a manner that appeals to both viewers.

When a user selects one of the search results, the media guidance application may store the search choice in association with the user or users as well as the words spoken in the conversation that led to the media selection, in a user preference profile or another cached profile associated with a user or device. Such information may be included in a database of media search terminology that may be built to improve search result quality.

In some environments, a viewer may not wish to have his or her conversation monitored, and in addition, a viewer may not want to have his or her conversation used to update search results in real time, in an iterative fashion, based on the conversation. To limit such potentially unwelcome effects, while still allowing some users to use portions of conversations to update search results, a home assistant device may be activated to listen to certain segments of a conversation, user comments, or instructions. Such activation may be performed by the viewers or by the media guidance application when the search results are displayed.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIGS. 3-9 show illustrative examples of updated search results based on statements made by a single viewer or a conversation among multiple viewers, that are displayed in a screen generated by a media guidance application in accordance with some embodiments of the disclosure;

DETAILED DESCRIPTION

Figure 1:
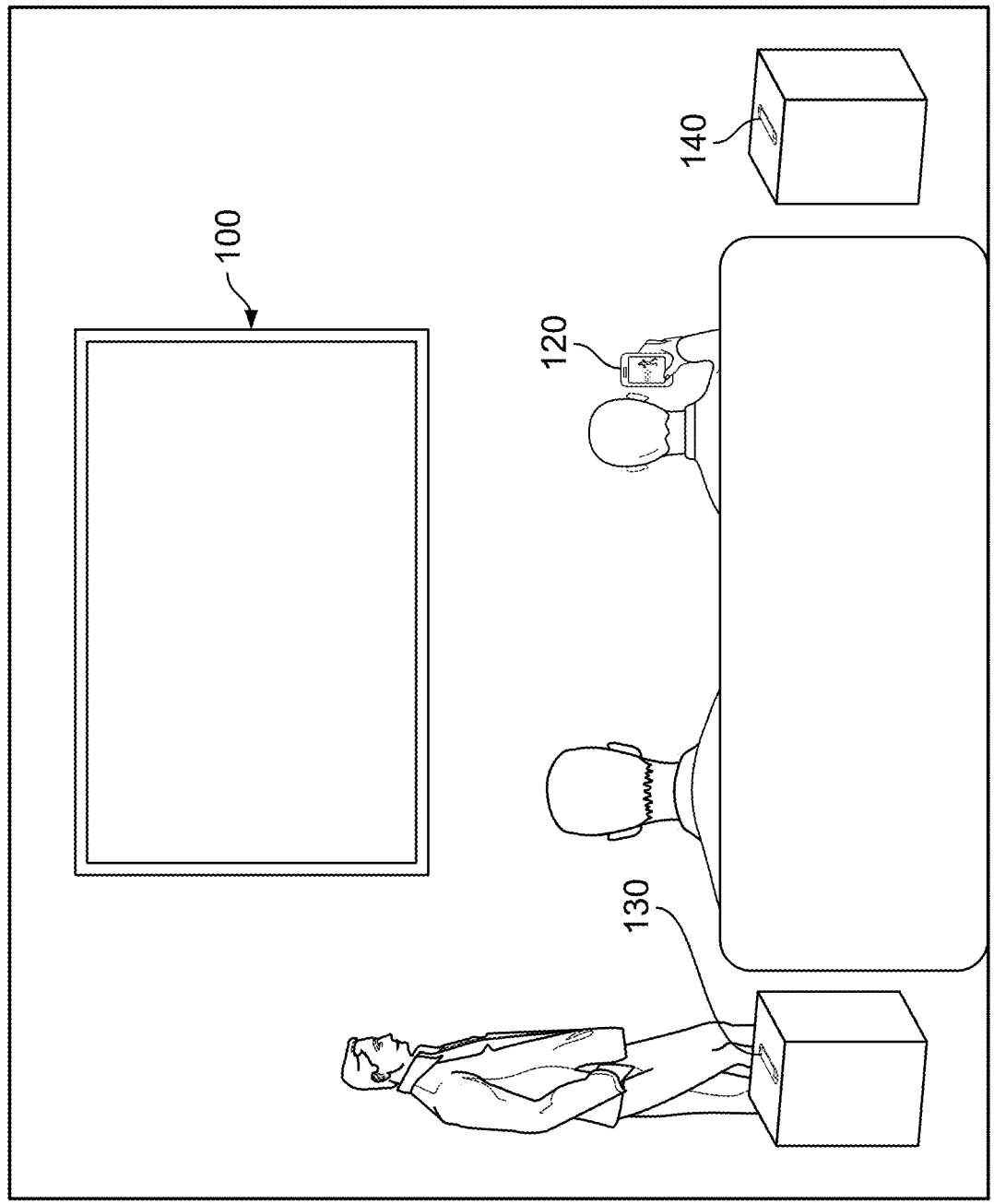
FIG. 1 shows an illustrative example of an environment in which a viewer or viewers may seek media and view a display of search results in a screen generated by a media guidance application in accordance with some embodiments of the disclosure.

Accordingly, systems and methods are described herein for enhancing a viewer's media consumption experience by updating search results based on a conversation. In particular, a viewer or viewers may request a search for a media asset. A media guidance application may perform the search and generate for display a list of search results based on the search. A viewer may make comments about the search results. Or multiple viewers may discuss the search results in a conversation following the display of the search results. A home assistant device, such as an Amazon Echo, Google Home, Apple HomePod, or another device, may be used to listen to the ensuing comment or conversation. The media guidance application may be coupled to the home assistant device (or alternatively, include the listening functionality of the device, itself), and may analyze the comment or conversation overheard by the home assistant device. Since a conversation may include multiple speakers with different opinions, the terms of the conversation may be compounding or conflicting as the speakers discuss the search results. In order for the media guidance application to determine which of the terms to include in a following search to update the search results, the media guidance application may determine a priority of the speakers in the conversation in order to limit or focus an update of the search results. The search results may be filtered and ranked based on one or both user preferences so that the search results may be interesting to both users even if only one user is prioritized in the search.

In an example, a priority of the speakers may be determined by analyzing the conversation between the speakers to detect instructive terms, such as deferential terms, pronouns or identifiers, positive or negative terms. In another example, the media guidance application may identify a speaker in the conversation and assign a baseline weight to the speaker based on a user profile for the speaker. As the conversation continues, priorities of the speakers may change. For example, one of the speakers may initially have strong opinions about the media search and search results, but then may become more willing to compromise and may suggest that another viewer decide. To handle the change in priority, the media guidance application may monitor the viewers' conversations to determine whether there is a change in instructions or deference among the viewers that may indicate such change.

In an example, the media guidance application may parse the conversation words to determine instructive, deferential, or other key terms spoken by the viewers that may be used to weight each of the viewers. When a weight for the viewers is set, the media guidance application may use the viewer weight as a basis for selecting words spoken by the viewers to use in a subsequent search. For example, the media guidance application may select words spoken by a viewer having a greater weight relative to another viewer. In this example, only words spoken by the viewer having the greatest weight may be used for updating the search results. In addition, the words spoken by the user having the greater weight may be selected for use in updating the search results when the words in the conversation for the user have relevance to the prior search or if the spoken words have a connection to the user's profile or preferences. On the other hand, words spoken by a viewer having a lower weight may be omitted from an update to the search results. In another scenario, words spoken by a viewer having a lower weight may have limited applicability to updating a search, for example, a lower weight viewer may have words in a conversation that may be selected only when the words are very relevant, for example, relevant to prior searches or genres or media that is determined to be of interest to other speakers in the conversation. For example, a lesser weighted user's preferences and viewing history may be used to fine tune search results by ranking or selecting certain media assets. In any of these scenarios, the home assistant device may monitor the conversations about the search results and update the media guidance application with such further conversations. In some scenarios, the media guidance application may initiate the home assistant device to listen for comments when the media guidance application generates a display of search results. The media guidance application may continue to parse the conversation to determine whether there are any indications in the conversation that suggest that one or other of the participants in the conversation should have his or her respective weight adjusted. Changes in weights for either of the participants may cause the media guidance application to select words spoken by a different speaker who may now have a relatively higher weight.

In an example, a viewer may request a search for media assets that is based on a media category, such as action movies. A media guidance application may search for the action movies. In some scenarios, the media guidance application may use user preferences and user history to improve the search results. The media guidance application may present a list of search results to the viewer, for example, in a display screen. The search results may be presented with information about the search request or basis for obtaining the search results. After the search results are displayed by the media guidance application, a home assistant device may be activated (or may be in a listening mode) to monitor a conversation between the viewer and another second user about the search results. In some scenarios, the media guidance application may initiate the home assistant device to listen for comments when the media guidance application generates a display of search results. The media guidance application may initiate a home assistant device to a listening mode that is near the search result display and/or near the viewers. The device may be activated for a period following the display so that it can listen for comments made about the search results.

The conversation about the search results may include any type of comments, opinions, or reactions to the search results. For example, the viewer may say, "I'd like to watch something old that we've seen before." In response, the second user may say, "no, it's my turn to decide, and I want to watch something new." Such a conversation may be captured by the home assistant device and analyzed by the media guidance application. The media guidance application may parse the terms of the conversation and detect that the second user stated, "it's my turn to decide," and assign a relatively greater weight to the second user based on the assertion by the second user identifying himself or herself using the pronoun, "my." Since the second user may now have the greater weight between the second user and the viewer, the media guidance application may select terms spoken by the second user, e.g., "I want to watch something new," which may cause the media guidance application to update the search results with only action movies that have a recent release date. Both users' preferences may be used to improve the search results. For example, since the first user said they wanted to watch something they had seen already, the search results for the newer items may be ranked so that items that have been seen already may be listed first. Alternatively, or in addition, one or the other of the user's preferences may be used to improve the search results. Sometimes the preferences for a non-prioritized user can be used to make a set of search results more applicable to both users. In other scenarios, the prioritized user's preferences may be more suitable for presenting interesting search results.

Turning to FIG. 1, an environment for using the features and functionalities described herein may be in a household having one or more individuals. There may be a television screen 100 that may be used to display media, as well as personal devices such as a smartphone 120, or a tablet device (not shown), which may include a screen capable of displaying media, as well as search results that can be updated. In addition, the environment may include one or more home assistant devices 130 and 140 which may be capable of listening, in a passive mode or upon activation, for instructions or comments from members of a household. The home assistant devices may be connected using a home network to one or more other devices, such as a device configured to run a media guidance application, speakers, smartphones, computers, lights, television screens, or other networked devices. Each of the members of the household may have a voice pattern profile that may be stored and recognized by the home assistant device so that user requests may be performed according to each respective user's preferences.

One or more of the viewers may initiate a search for media by any technique, such as entering a query in the media guidance application using an input device or an audio or voice command. The media guidance application may perform the media search by searching for a keyword or other search parameter in a media database. The media guidance application may use any suitable search technique to provide suitable results, including, using details from the search requester's user history or preferences, or from overall media rankings, or other search techniques. The media guidance application may generate a display of the search results on a screen, such as a television screen 100 or smartphone 120 for the viewer.

Figure 2:
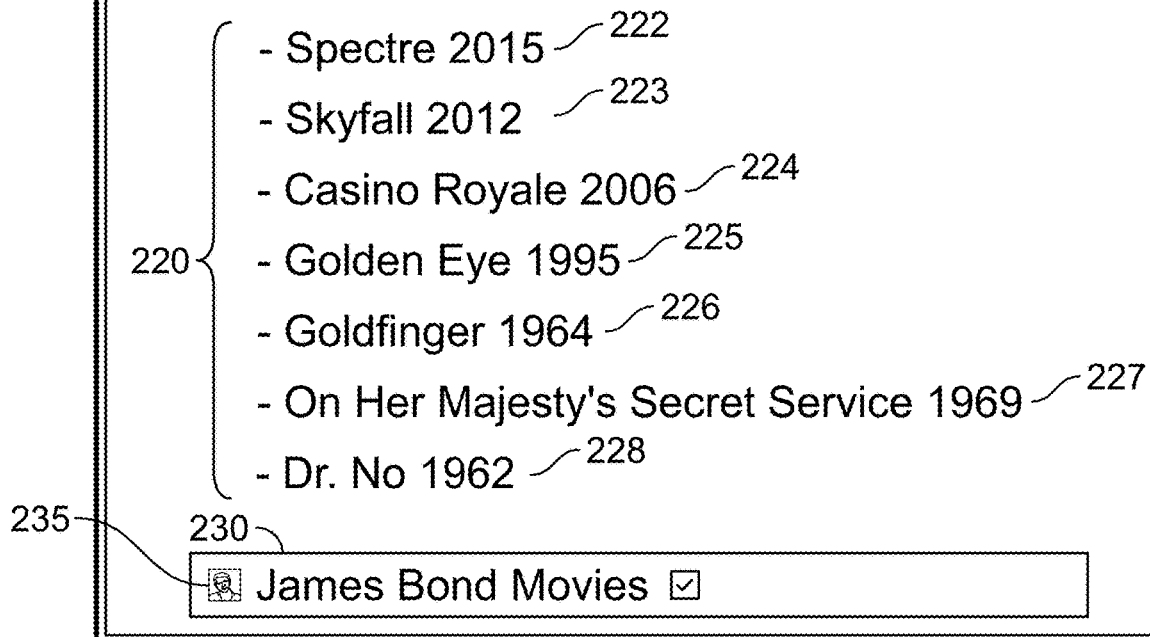
FIG. 2 shows an illustrative example of search results displayed in a screen generated by a media guidance application in accordance with some embodiments of the disclosure.

Turning to FIG. 2, in an example, search results may be displayed in a screen 200 based on a user initiated request for, "James Bond Movies" 210. The text of the search request 210 may be displayed on screen 200 to inform the viewer of the search basis or search trail. In some scenarios, such text may be omitted. The search results 220 may be obtained by the media guidance application which may generate display screen 200 including search results 220 based on one user's search request. The search results 220 may include several different movies (222-228) in the James Bond franchise of movies. The search results 220 may include James Bond movies from different periods and can include James Bond movies that are relatively popular among movie viewers, or in particular, James Bond movies that are preferred by the search requester. Information about each of the James Bond movie options may be included in the display screen, such as release year, or other suitable metadata about the movie. The basis for the search "James Bond movies" 230 may also appear in the display with an option for including it or removing it. An icon 235 may be displayed alongside the search trail 230 as an indication of the source of the comment or search request. Such icon may be helpful so that users can see which of their comments may have affected the search results. Providing icon 235 may also be helpful if, for example, one viewer wishes to remove all comments from one or the other viewer. To remove one viewer's comments, the viewer may speak a comment, which may also be a command, that is heard by the home assistant device and transmitted to the media guidance application for use in updating the search. The removal of a viewer's comments from a search trail may be based on an explicit comment or command or performed automatically by the media guidance application based on a change in weight and priority of the viewers. The viewers may be identified for this purpose using voice matching performed by the home assistant device or by identification of the icon 235 in the results screen, or other suitable method. The icon 235 may also provide a visual representation of which viewer's comments may be affecting the search. The icon 235 may be a customized avatar or related to the user, or may be a generic symbol to differentiate users. Other options, not shown, such as save, exit, back, undo, or other choices may be included in the display.

When the search results are presented in screen 200, a listening device, such as a home assistant device (130 or 140 (FIG. 1)) may be activated, may be passively listening, or may be activated by the media guidance application to monitor a conversation about the search results when the search results are displayed. The media guidance application may activate a home assistant device (130 or 140 (FIG. 1)) based on proximity to the screen 200 and/or the viewers. In addition, the home assistant device (130 or 140 (FIG. 1)) may be activated for a certain period of time following display of the search results. In some scenarios, the home assistant device (130 or 140 (FIG. 1)) may recognize a voice pattern of the search requester and can store the search request in association with the identity of the search requester to build a user history profile. The home assistant device may monitor a conversation, comments, or voice instructions following the results presented in screen 200 and may capture a comment relevant to the search results. In some scenarios, the home assistant device (130 or 140 (FIG. 1)) may analyze comments to determine whether the words are relevant to the search results. A determination of whether the words are relevant to the search results may be performed by capturing words spoken by a viewer, in, for example, a conversation with another viewer, or as a voice instruction or comment for a single viewer, using the home assistant device (130 or 140 (FIG. 1)) or other audio capable device and analyzing the words using a media guidance application processor using natural language processing techniques and speech-to-text techniques to convert the conversation into text. Text corresponding to the search results, including, for example, the text of the options displayed on the screen 200, as well as text corresponding to metadata for each of the options displayed on the screen 200 may be referenced by the media guidance application and compared to the text of the comments. Such text may be made available in a manner that can be recognized by the viewer so that he or she may call on such text as a trigger for refining the search results. Conversation text that directly matches or overlaps, or is related to a synonym of the search result text may be determined to be related to the search results. In addition to the search result text, the media guidance application may have a glossary of certain media related terms such as actor, genre, popular programming, or other terms to reference in a determination of whether comments are related to the search results.

If the words are not relevant, the home assistant device (130 or 140 (FIG. 1)) may ignore the comments. If, however, the words are determined to be relevant to the search results, the home assistant device (130 or 140 (FIG. 1)) may send text for the comments or conversation to the media guidance application. (In some scenarios, the home assistant device may send recorded conversation data to a processor to analyze.) In an example, the home assistant device may overhear a conversation in which one or two or more viewers are discussing the James Bond movie result options 220 (FIG. 2) and one of the participants may make a comment, "James Bond, but not Daniel Craig." In another example, there may be one viewer of search results 220 (FIG. 2) making the same comment, "James Bond, but not Daniel Craig," that may be meant as a comment to refine the search. Analysis of this comment may determine that Daniel Craig is an actor that has played the character James Bond. Such comment may cause the search results to be updated as shown in FIG. 3.

Figure 3:
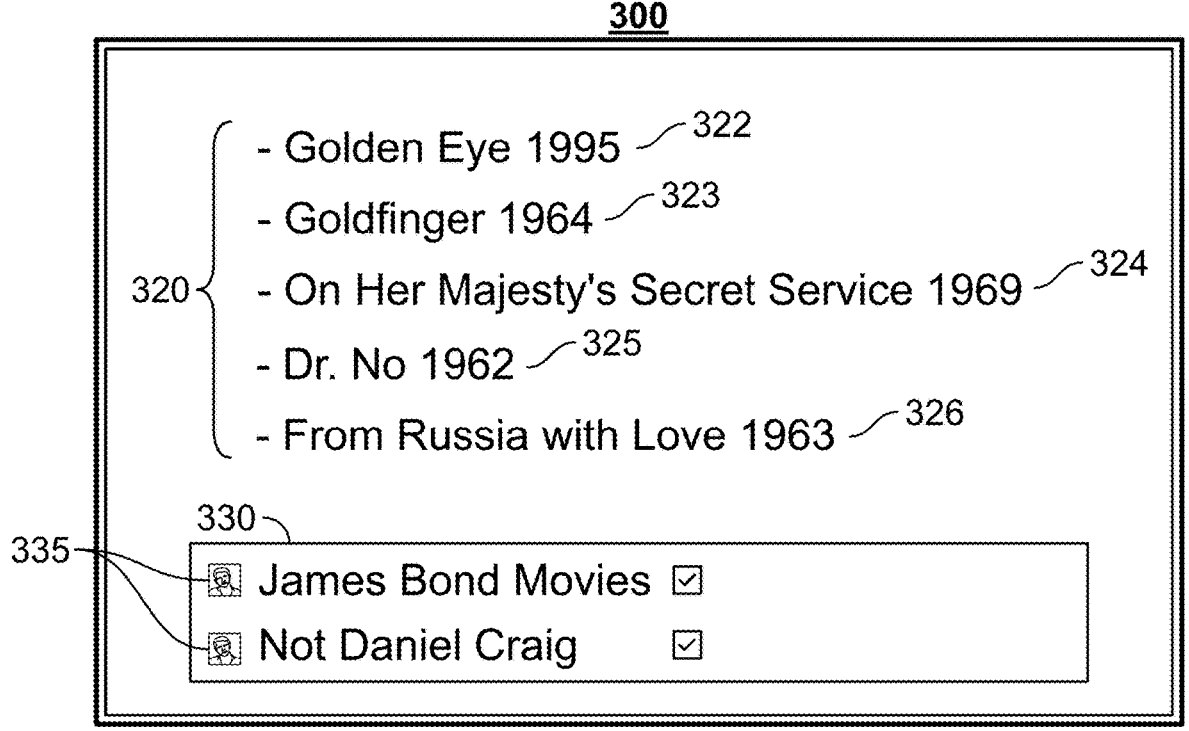

Turning to FIG. 3, a display screen 300 may be generated to show an update to search results previously shown in FIG. 2, based on a comment in conversation, "not Daniel Craig," 310. In some scenarios, the conversation may be one-sided and the search results may be updated based on comments from one of the viewers of the search results shown in FIG. 2. The text 310 used to update the search request may be displayed on screen 300 to inform the viewer (or viewers) of the basis for updating the search. In some scenarios, such text 310 may be omitted. The search results 320 are shown as an update to those shown previously as search results 220 (FIG. 2) to remove James Bond movies that include Daniel Craig. Thus, for example, Spectre, Skyfall and Casino Royale (222, 223 and 224 (FIG. 2)) are removed from the list of search results 320. Some additional James Bond movies, such as From Russia with Love 326 may be added to the search results 320. The addition of new option 326 may be based on popularity of the movie, or relevance to the speaker of the comment, "not Daniel Craig." The basis for updating the search results in FIG. 3 may be presented in the display, e.g., James Bond movies, and not Daniel Craig 330. The information about updating the search results may be helpful to the users to see how the search has changed in light of the viewer's conversation (or in the case of a single viewer, the comments of the single viewer). The order of the results 320 may be ranked based on one or both of the viewer's preferences or viewing histories. In some scenarios, the results 320 may be ranked based on a media popularity ranking so that the most commonly viewed media item is ranked more highly. An icon 335 may be displayed alongside the search trail 330 as an indication of the source of the comment. Such icon may be helpful so that users can see which of their comments may have affected the search results. Providing icon 335 may also be helpful if, for example, one viewer wishes to remove all comments from one or the other viewer. Removing the comments of a viewer may be performed by the media guidance application in response to a command or trigger such as a comment by one of the viewers to remove one viewer's comments, or comments associated with an icon 335, or other suitable command. The icon 335 may also provide a visual representation of which viewer's comments may be affecting the search.

Figure 4:
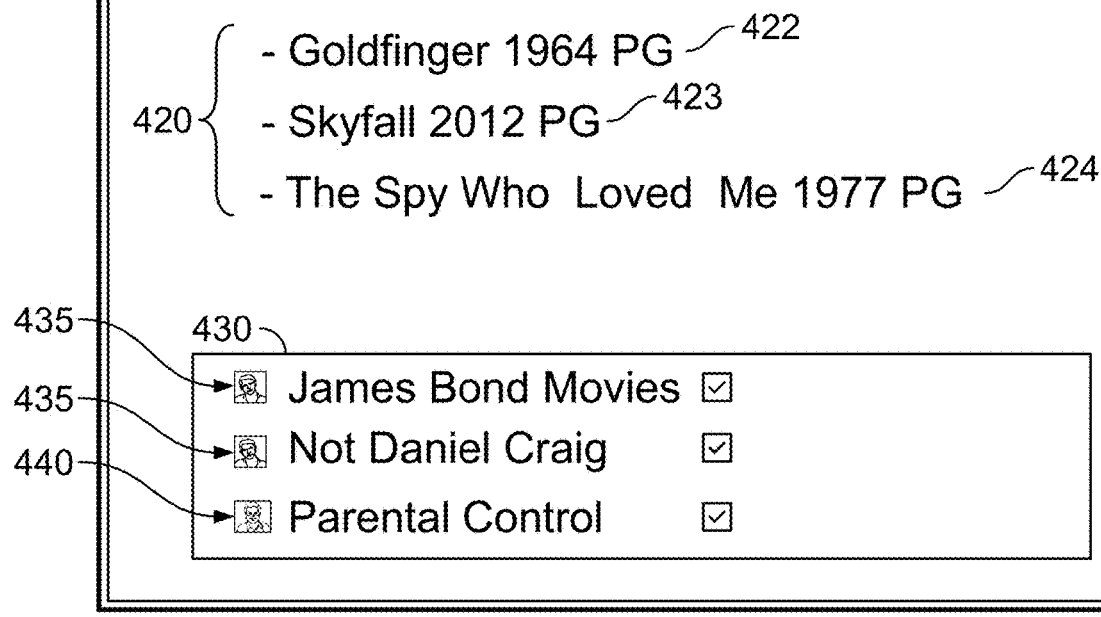

A conversation about the search results may continue between the viewers in response to the search options 320. Another voice in the conversation may state, for example, "not James Bond again." And in response, a second voice may state, "Yes, James Bond." When a home assistant device (130 or 140 (FIG. 1)) hears such comments, the media guidance application may yield the updated list of search results shown in FIG. 4. FIG. 4 shows a display screen 400 which may include comments from the conversation 410 and 415 referring to the search results 320 (FIG. 3). In an example, the speaker of the comment, "not James Bond again" 410 may be identified by the home assistant device (130 or 140 (FIG. 1)) as being a child, using a voice pattern profile. In some scenarios, when a child is discussing search results with an adult, e.g., a parent, the media guidance application may associate a lesser weight with the child and give greater weight to the comments of the adult. In another scenario, the media guidance application may ignore the comments from the child. Parents may configure settings in the home assistant device (130 or 140 (FIG. 1)) or media guidance application to reflect preferences in this regard. Since the home assistant device (130 or 140 (FIG. 1))

may have identified one of the participants in the conversation as a child, the search results may be updated by the media guidance application to the choices 420 which include James Bond movies having a PG rating. Thus, the search results may be updated according to the intents and wishes of a prioritized user, while taking into account that the other viewer may be a minor and so the results should have a PG rating. This technique allows the results to be interesting and relevant to both viewers. In addition, the media guidance application may weight more highly the speaker of a positive or affirmative comment and select the terms, "Yes, James Bond," 415 to use in updating the search results to obtain the options 420. At the same time, the media guidance application may give less weight to a speaker of a negative comment, such as, "not James Bond again," 410. If the media guidance application detects that a second similar negative comment by a second speaker, which may indicate agreement on some point, the media guidance application may update the search results to omit the agreed upon disliked aspect of the search results. The search trail, beginning with the search basis from FIG. 2, may be presented in 430 including James Bond movies, not Daniel Craig, and the parental control rating so that the viewers can keep track of the search trail. An icon 435 may be displayed alongside the search basis trail 430 as an indication of the source of the comment. For example, icon 440 may be displayed next to parental control so that the viewers can see that the presence of a child may affect the search results. Options to keep or remove such search bases may be available so that the users can update or refine the search. The search trails 230 (FIG. 2), 330 (FIG. 3) and 430 (FIG. 4) may be presented in side-by-side windows or other layout so that the viewer can see how the search terms affect the updated search results.

The media guidance application may update search results iteratively based on a conversation about the search results. As a conversation continues, the results may be updated based on recent comments which may be applied to the most recent search results, and also prior iterations of search results. In addition, the users' preferences may be applied in each iteration to further refine the search results. The media guidance application may track comments and the development of a search and its iterations until a selection of a media asset is made. The comments and search development may be displayed in the user interface so that the user can see the search development. The comments and searches may be associated with individuals participating in the conversation and used to develop a search history and user history for the viewers. The search and user histories may be stored in a user profile and may also be used to refine a search. This can be particularly helpful with natural language queries when a user is not using a category or title or keywords to perform a search.

Figure 5:
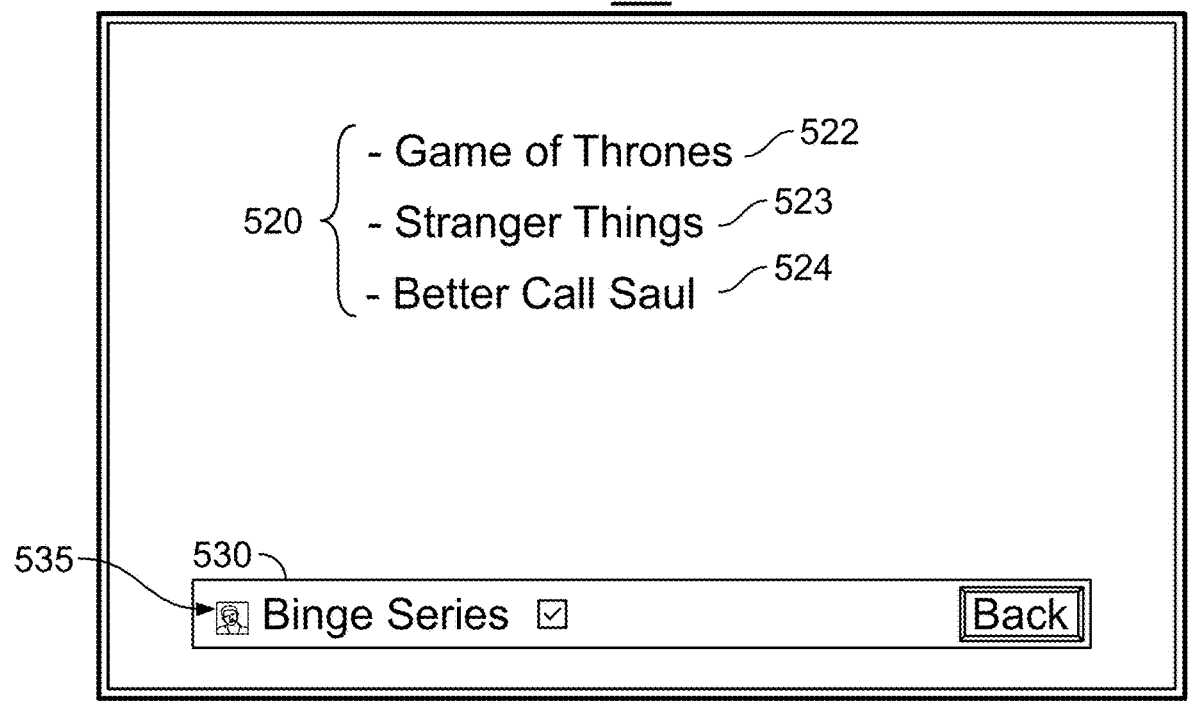

In another example, a first viewer may initiate a search for media by speaking or inputting a search command, such as, "let's binge something." The search results may be depicted as shown in FIG. 5, which shows a display screen 500 having the text of the search, "let's binge something" 510 as well as some search results 520 that include media that is commonly binge-watched. In addition, the search results 520 may be based on a user preference or user history for the search requester. The text of the search 510 may be displayed or omitted. The search results 520 may be presented in a manner that allows each be selected to access the media. Additional information about each of the media options for the search results 520 may be displayed as well. The basis of the search may be presented in a bottom window 530 along with other options for the search, such as save, back, undo, exit, or other media options and media categories. An icon 535 may be displayed alongside the search basis 530 as an indication of the source of the comment. Such icon may be helpful so that users can see which of their comments may have affected the search results. Providing icon 535 may also be helpful if, for example, one viewer wishes to remove all comments from one or the other viewer. Viewer comments may be removed by an oral command indicating which viewers' comments to remove, or by identifying comments associated with an icon, e.g., icon 535, or by an input using an input device and selecting comments via the display. The icon 535 may also provide a visual representation of which viewer's comments may be affecting the search.

In response to the search results shown in FIG. 5, a conversation may begin between viewers of the results. For example, two viewers may talk to each other about the search results 520. A first viewer may say, "how about something funny?" This comment may be heard by a home assistant device (130 or 140 (FIG. 1)) that can be activated to listen to a conversation to assist with updating the search results, or it can be set to a passive listening mode which may activate, for example, when it senses a relevant comment or instruction. In response to receiving the comment from the home assistant device (130 or 140 (FIG. 1)), a media guidance application may analyze the comment to perform a natural language query based on the comment.

In FIG. 6, the first viewer's comment, "how about something funny," may be selected by the media guidance application to update the search results 520 (FIG. 5). Since the prior set of search results 520 (FIG. 5) were related to binged media, an update based on the conversation may include comedies that are often binge watched. Thus, updated search results based on a comment, "how about something funny?" 610 may lead to a display screen 600 being generated including updated search results 620 having options for comedies that are frequently binge watched. The search results 620 may be ranked based on relative popularity of the media, or based on user preferences for one or both of the viewers, or a combination thereof. A search trail 630 may include the search bases, for example: binge series and funny. The search trail 630 allows the viewer to see how the searched comments affect the updated search results. An icon 635 may be displayed alongside the search trail 630 as an indication of the source of the comment. Such icon 635 may be helpful so that users can see which of their comments may have affected the search results.

Generally speaking, the media guidance application may store the comments of the viewers in association with a viewer profile so that a user history can be established to improve search results. An identity of the user may be obtained using a voice pattern profile so that the comments in the conversation can be assigned to a particular user. Alternatively, the media guidance application may store the conversation comments to an unspecified user so that the user's identity is not stored, rather all comments for one user are stored together without an associated user.

In response to the display of binge-able media search results 620, the viewers may comment on the set of search results, and the second viewer may comment, "I like that actor." Metadata for each of the search results 620 may be searched to determine cast information, and an updated set of search results including other comedies with a related cast may be produced, as shown in FIG. 7. FIG. 7 shows a display screen 700 with an updated search based on the comment, "I like that actor," 710. The updated search results 720 may include, for example, "Cheers" 722 which a comedy starring Ted Danson who also appears in, "The Good Place" 622 (FIG. 6), and, "The Office" 723 which is a comedy starring Mindy Kaling and Ellie Kemper who appear in, "The Mindy Project" 625 and, "Unbreakable Kimmy Schmidt" 627, respectively. The actors, as well as the prior search bases may be presented in window 730 so that the viewers can follow the search evolution. The viewers may select or remove any of the search terms in 730 to further refine the search. The results 720 may be presented in an order based on popularity of the media, or based on user preferences for one or both of the viewers, or a combination thereof. In some scenarios, the ranking may be performed based on the preferences of the non-prioritized viewer so that the results may be interesting to both viewers. In other scenarios, the ranking may be performed based on preferences for the prioritized viewer. Icons 735 and 740 may be placed alongside the search trail comments and options so that the viewers can see which of their comments or user preferences may be affecting the search results.

Figure 8:
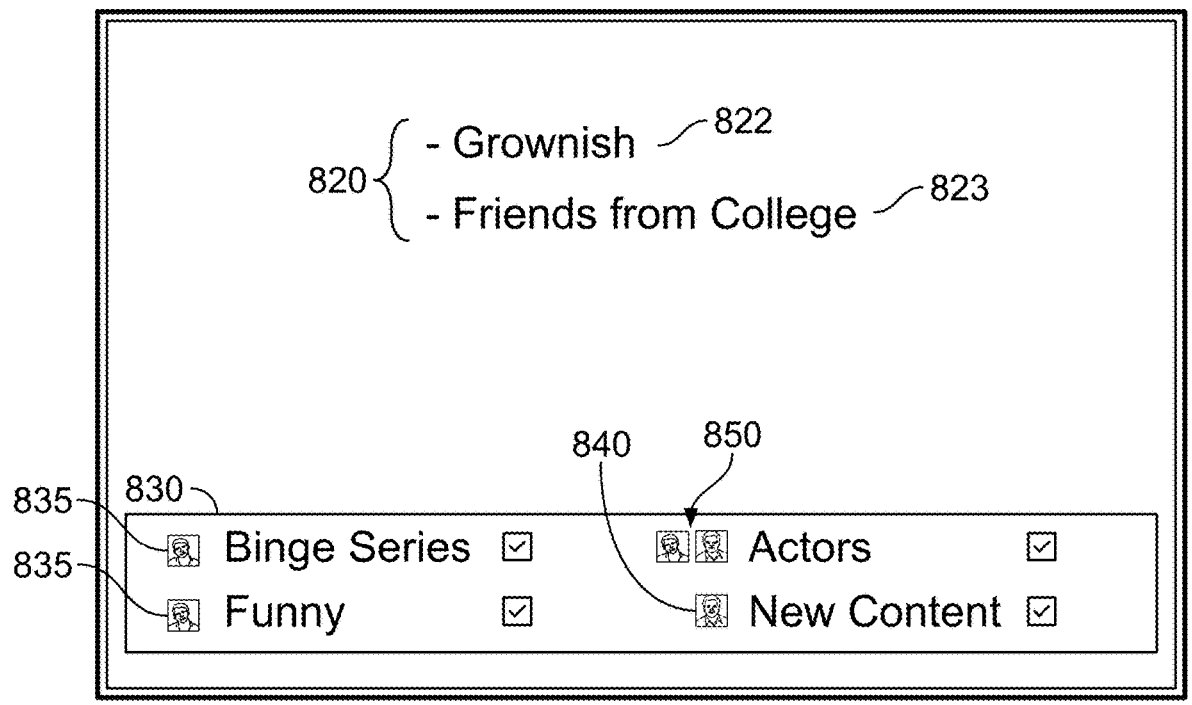

The viewers may continue talking about the new search results 720, and the second viewer may comment that they want, "only new stuff." The media guidance application may update the search results in FIG. 7 to obtain those shown in FIG. 8. FIG. 8 shows a display screen 800 having updated search results based on a comment, "only new stuff," 810. Of the search results 720 (FIG. 7) shown previously, the media guidance application may remove choices having an early release date and update the search results to include those having more recent releases. Thus, new search results 820 may be presented in display 800. The search trail may be shown in 830 so that the viewers can keep track of the search process. Icons 835 and 840 may be displayed alongside the search trail 830 options so that the viewers can see which of their comments and preferences may be affecting the search results. Both icons representing both viewers, e.g., 850, may indicate that some options are relevant to both viewers. In some scenarios, windows for prior sets of search results and search terms may be shown in the display so that the viewers can go back or forward within the sets of search results.

Viewing numerous iterations of search results may be helpful to some users. Other users may find the multitude of choices and variations unhelpful. At some point in the conversation, the first viewer may no longer wish to comment on the search results and may defer to the second viewer. That first viewer may say, for example, "you decide," to the second viewer. The home assistant device (130 or 140 (FIG. 1)) may deliver this comment for analysis by the media guidance application which may determine that it indicates a deferential statement indicating that the first viewer wishes to let the second viewer choose an option. This statement may cause the media guidance application to adjust a weight for the second viewer so that the comments spoken by the second viewer will take priority over the comments of the first viewer. Thus, a new set of search results may be presented to the viewers in FIG. 9.

Figure 9:
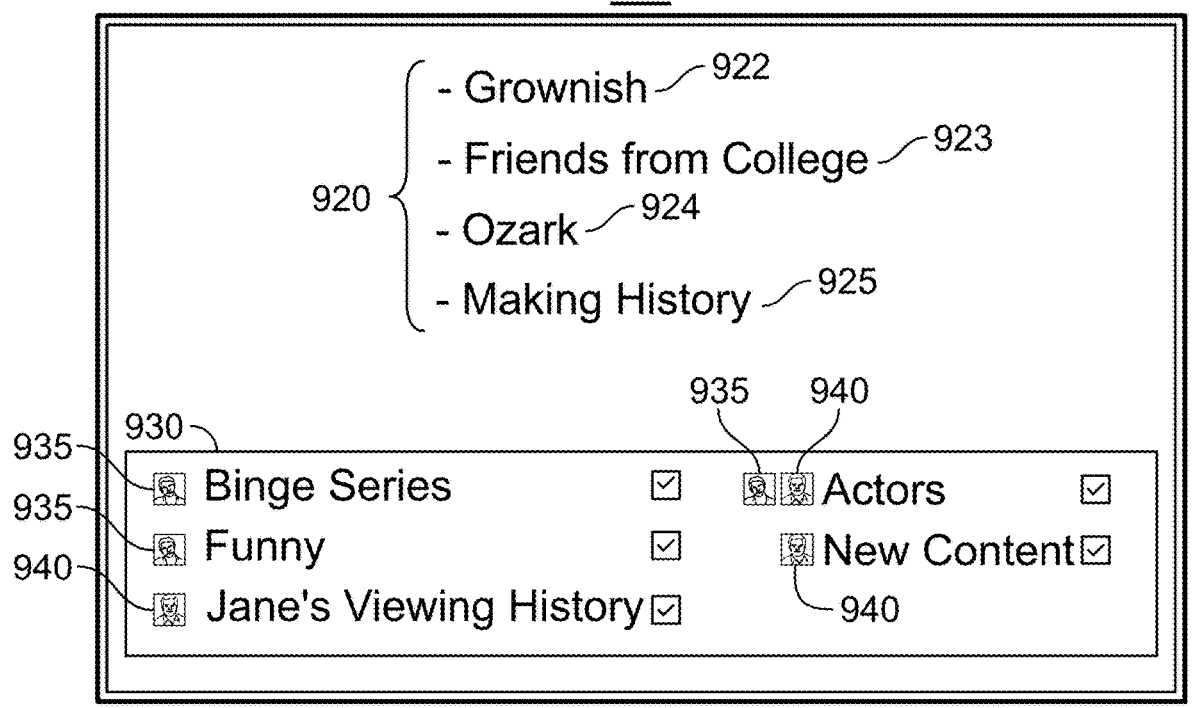

FIG. 9 depicts a display screen 900 having updated search results based on a comment, "you decide" 910. The comment 910 may be included in the display 900 or omitted. The comment 910 may also be displayed in a manner which indicates which of the viewers said the comment. For example, in FIG. 9, the first viewer comment, "you decide," 910 is shown in bold. In FIG. 8, the second viewer comment, "only new stuff," 810 is shown in bold italics. Other ways of distinguishing a source of the comment may also be used, such as a personal icon, color, or other manner.

The updated search results 920 may be obtained by the media guidance application using selected comments by the second viewer since the first viewer has deferred the choice to the second viewer. Thus, the search results 920 may include new media items, and media having actors in common with earlier sets of search results, but may not necessarily be limited to comedies, which was a comment added by the first viewer in the search update 620 (FIG. 6). The search results 920 may be presented based on the user preferences of the newly prioritized viewer, however some search results that appeal to both or other user viewer may be presented so that the set of search results 920 are interesting to both users. The search trail 930 may be presented so that the users can see the search path. The search trail 930 may be displayed with icons 935 and 940 indicating a user associated with comments and preferences so that the viewers can see how their selections and comments may affect the search results.

Although the examples shown in FIGS. 2-9 appear to contain single comments from a conversation, the comments can be overlapping and can be part of an ongoing conversation between viewers and the comments are portions of the conversation. In some scenarios, this may be because one viewer is making comments. As the conversation continues, the media guidance application may select and omit comments of the viewers for updating the search results using an adjustable weight for each viewer. The weight may vary based on perceived comments in the conversation such as deference, commands, positive comments, negative comments, and other factors. A search trail may be presented in the display with the updated search results, or presented in other windows so that the viewers can keep track of the search path and updates. Providing multiple window panes of search sets may be helpful so that the users can see how certain comments may affect search results. In addition, such panes may be used to save, and go back and forth easily through the search results.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms, "media asset" and, "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term, "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase, "user equipment device,", "user equipment,", "user device,", "electronic device,", "electronic equipment,", "media equipment device," or, "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data" or, "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 10:
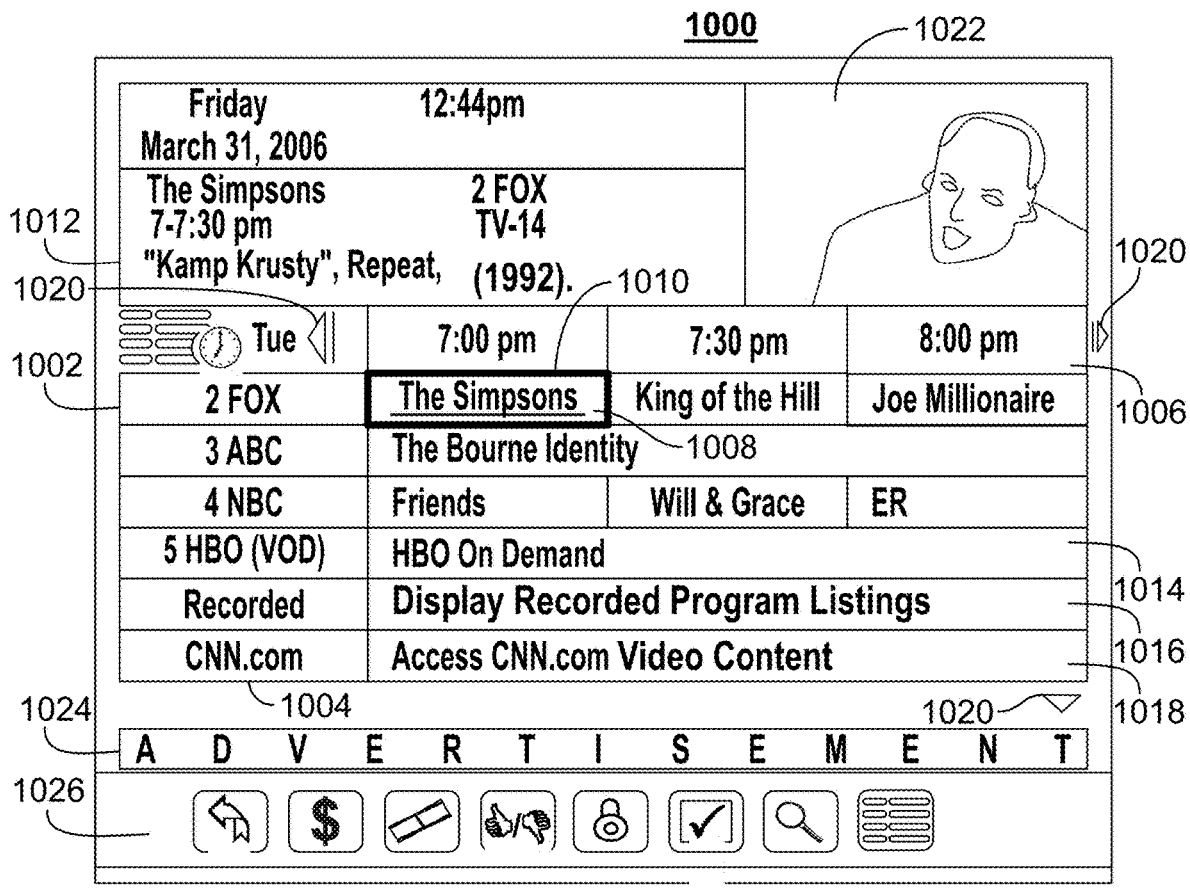
FIGS. 10-11 show other illustrative examples of display screens generated by a media guidance application in accordance with some embodiments of the disclosure.
Figure 11:
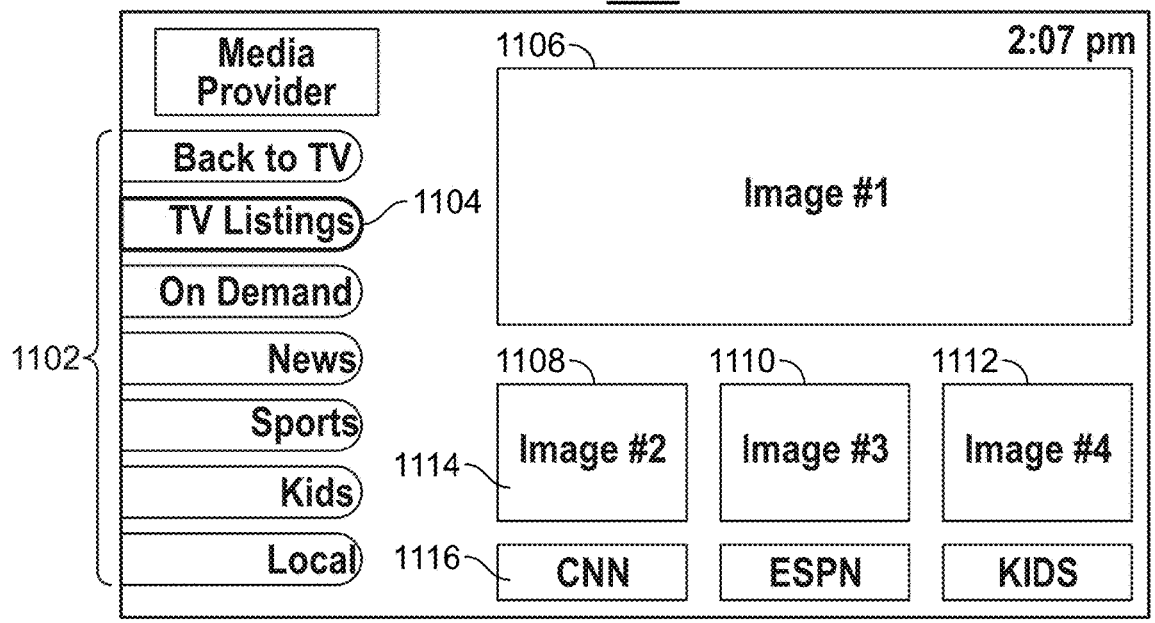

FIGS. 10-11 show illustrative display screens that may be used to provide media guidance data. The display screens shown in FIGS. 10-11 may be implemented on any suitable user equipment device or platform. While the displays of FIGS. 10-11 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 10 shows illustrative grid of a program listings display 1000 arranged by time and channel that also enables access to different types of content in a single display. Display 1000 may include grid 1002 with: (1) a column of channel/content type identifiers 1004, where each channel/content type identifier (which is a cell in the column) identifies a different channel or content type available; and (2) a row of time identifiers 1006, where each time identifier (which is a cell in the row) identifies a time block of programming. Grid 1002 also includes cells of program listings, such as program listing 1008, where each listing provides the title of the program provided on the listing's associated channel and time. With a user input device, a user can select program listings by moving highlight region 1010. Information relating to the program listing selected by highlight region 1010 may be provided in program information region 1012. Region 1012 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing, "The Sopranos" and, "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 1002 may provide media guidance data for non-linear programming including on-demand listing 1014, recorded content listing 1016, and Internet content listing 1018. A display combining media guidance data for content from different types of content sources is sometimes referred to as a, "mixed-media" display. Various permutations of the types of media guidance data that may be displayed that are different than display 1000 may be based on user selection or guidance application definition (e.g., a display of only recorded and broadcast listings, only on-demand and broadcast listings, etc.). As illustrated, listings 1014, 1016, and 1018 are shown as spanning the entire time block displayed in grid 1002 to indicate that selection of these listings may provide access to a display dedicated to on-demand listings, recorded listings, or Internet listings, respectively. In some embodiments, listings for these content types may be included directly in grid 1002. Additional media guidance data may be displayed in response to the user selecting one of the navigational icons 1020. (Pressing an arrow key on a user input device may affect the display in a similar manner as selecting navigational icons 1020.)

Display 1000 may also include video region 1022, and options region 1026. Video region 1022 may allow the user to view and/or preview programs that are currently available, will be available, or were available to the user. The content of video region 1022 may correspond to, or be independent from, one of the listings displayed in grid 1002. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 1026 may allow the user to access different types of content, media guidance application displays, and/or media guidance application features. Options region 1026 may be part of display 1000 (and other display screens described herein), or may be invoked by a user by selecting an on-screen option or pressing a dedicated or assignable button on a user input device. The selectable options within options region 1026 may concern features related to program listings in grid 1002 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized, "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 13. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 11. Video mosaic display 1100 includes selectable options 1102 for content information organized based on content type, genre, and/or other organization criteria. In display 1100, television listings option 1104 is selected, thus providing listings 1106, 1108, 1110, and 1112 as broadcast program listings. In display 1100 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 1108 may include more than one portion, including media portion 1114 and text portion 1116. Media portion 1114 and/or text portion 1116 may be selectable to view content in full-screen or to view information related to the content displayed in media portion 1114 (e.g., to view listings for the channel that the video is displayed on).

The listings in display 1100 are of different sizes (i.e., listing 1106 is larger than listings 1108, 1110, and 1112), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 12:
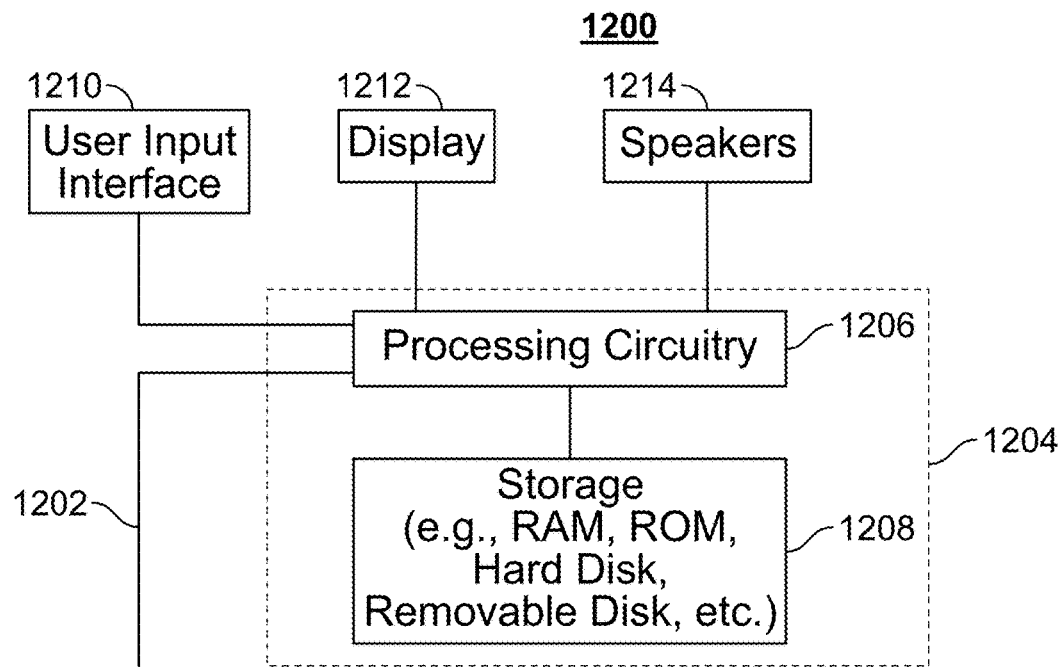
FIG. 12 is a block diagram of an illustrative user equipment device in accordance with some embodiments of the disclosure.

Users may access content and the media guidance application (and its display screens described above and below) from one or more of their user equipment devices. FIG. 12 shows a generalized embodiment of illustrative user equipment device 1200. More specific implementations of user equipment devices are discussed below in connection with FIG. 13. User equipment device 1200 may receive content and data via input/output (hereinafter, "I/O") path 1202. I/O path 1202 may provide content (e.g., broadcast programming, on-demand programming, Internet content, content available over a local area network (LAN) or wide area network (WAN), and/or other content) and data to control circuitry 1204, which includes processing circuitry 1206 and storage 1208. Control circuitry 1204 may be used to send and receive commands, requests, and other suitable data using I/O path 1202. I/O path 1202 may connect control circuitry 1204 (and specifically processing circuitry 1206) to one or more communications paths (described below). I/O functions may be provided by one or more of these communications paths, but are shown as a single path in FIG. 12 to avoid overcomplicating the drawing.

Control circuitry 1204 may be based on any suitable processing circuitry such as processing circuitry 1206. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1204 executes instructions for a media guidance application stored in memory (i.e., storage 1208). Specifically, control circuitry 1204 may be instructed by the media guidance application to perform the functions discussed above and below. For example, the media guidance application may provide instructions to control circuitry 1204 to generate the media guidance displays. In some implementations, any action performed by control circuitry 1204 may be based on instructions received from the media guidance application.

In client-server based embodiments, control circuitry 1204 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 13). In addition, communications circuitry may include circuitry that enables peer-to-peer communication of user equipment devices, or communication of user equipment devices in locations remote from each other (described in more detail below).

Memory may be an electronic storage device provided as storage 1208 that is part of control circuitry 1204. As referred to herein, the phrase, "electronic storage device" or, "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 1208 may be used to store various types of content described herein as well as media guidance data described above. Nonvolatile memory may also be used (e.g., to launch a boot-up routine and other instructions). Cloud-based storage, described in relation to FIG. 13, may be used to supplement storage 1208 or instead of storage 1208.

Control circuitry 1204 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 1204 may also include scaler circuitry for upconverting and downconverting content into the preferred output format of the user equipment 1200. Circuitry 1204 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 1208 is provided as a separate device from user equipment 1200, the tuning and encoding circuitry (including multiple tuners) may be associated with storage 1208.

A user may send instructions to control circuitry 1204 using user input interface 1210. User input interface 1210 may be any suitable user interface, such as a remote control, mouse, trackball, keypad, keyboard, touch screen, touchpad, stylus input, joystick, voice recognition interface, or other user input interfaces. Display 1212 may be provided as a stand-alone device or integrated with other elements of user equipment device 1200. For example, display 1212 may be a touchscreen or touch-sensitive display. In such circumstances, user input interface 1210 may be integrated with or combined with display 1212. Display 1212 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 1212 may be HDTV-capable. In some embodiments, display 1212 may be a 3D display, and the interactive media guidance application and any suitable content may be displayed in 3D. A video card or graphics card may generate the output to the display 1212. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 1204. The video card may be integrated with the control circuitry 1204. Speakers 1214 may be provided as integrated with other elements of user equipment device 1200 or may be stand-alone units. The audio component of videos and other content displayed on display 1212 may be played through speakers 1214. In some embodiments, the audio may be distributed to a receiver (not shown), which processes and outputs the audio via speakers 1214.

The guidance application may be implemented using any suitable architecture. For example, it may be a stand-alone application wholly-implemented on user equipment device 1200. In such an approach, instructions of the application are stored locally (e.g., in storage 1208), and data for use by the application is downloaded on a periodic basis (e.g., from an out-of-band feed, from an Internet resource, or using another suitable approach). Control circuitry 1204 may retrieve instructions of the application from storage 1208 and process the instructions to generate any of the displays discussed herein. Based on the processed instructions, control circuitry 1204 may determine what action to perform when input is received from input interface 1210. For example, movement of a cursor in a display up/down may be indicated by the processed instructions when input interface 1210 indicates that an up/down button was selected.

In some embodiments, the media guidance application is a client-server based application. Data for use by a thick or thin client implemented on user equipment device 1200 is retrieved on-demand by issuing requests to a server remote to the user equipment device 1200. In one example of a client-server based guidance application, control circuitry 1204 runs a web browser that interprets web pages provided by a remote server. For example, the remote server may store the instructions for the application in a storage device. The remote server may process the stored instructions using circuitry (e.g., control circuitry 1204) and generate the displays discussed above and below. The client device may receive the displays generated by the remote server and may display the content of the displays locally on equipment device 1200. This way, the processing of the instructions is performed remotely by the server while the resulting displays are provided locally on equipment device 1200. Equipment device 1200 may receive inputs from the user via input interface 1210 and transmit those inputs to the remote server for processing and generating the corresponding displays. For example, equipment device 1200 may transmit a communication to the remote server indicating that an up/down button was selected via input interface 1210. The remote server may process instructions in accordance with that input and generate a display of the application corresponding to the input (e.g., a display that moves a cursor up/down). The generated display is then transmitted to equipment device 1200 for presentation to the user.

In some embodiments, the media guidance application is downloaded and interpreted or otherwise run by an interpreter or virtual machine (run by control circuitry 1204). In some embodiments, the guidance application may be encoded in the ETV Binary Interchange Format (EBIF), received by control circuitry 1204 as part of a suitable feed, and interpreted by a user agent running on control circuitry 1204. For example, the guidance application may be an EBIF application. In some embodiments, the guidance application may be defined by a series of JAVA-based files that are received and run by a local virtual machine or other suitable middleware executed by control circuitry 1204. In some of such embodiments (e.g., those employing MPEG-2 or other digital media encoding schemes), the guidance application may be, for example, encoded and transmitted in an MPEG-2 object carousel with the MPEG audio and video packets of a program.

Figure 13:
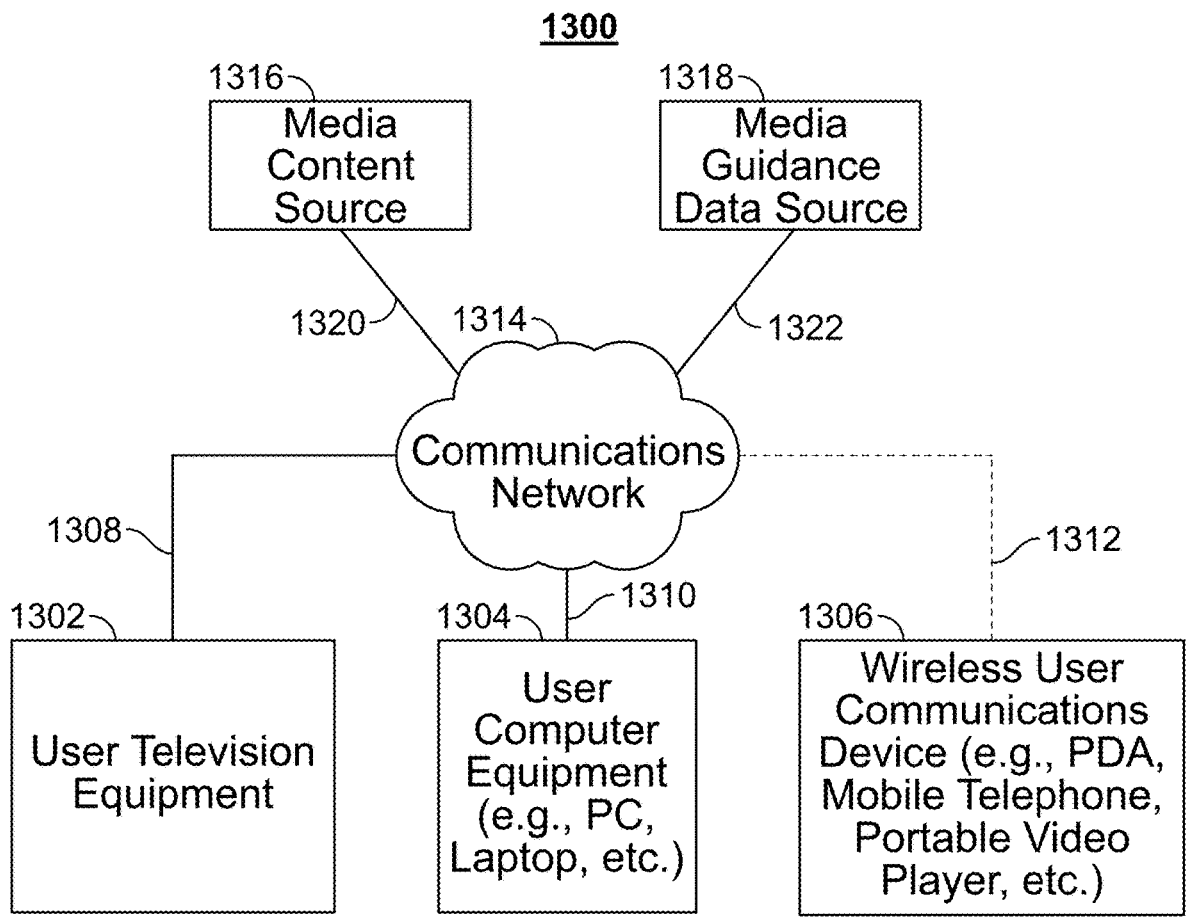
FIG. 13 is a block diagram of an illustrative media system in accordance with some embodiments of the disclosure.

User equipment device 1200 of FIG. 12 can be implemented in system 1300 of FIG. 13 as user television equipment 1302, user computer equipment 1304, wireless user communications device 1306, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 12 may not be classified solely as user television equipment 1302, user computer equipment 1304, or a wireless user communications device 1306. For example, user television equipment 1302 may, like some user computer equipment 1304, be Internet-enabled allowing for access to Internet content, while user computer equipment 1304 may, like some television equipment 1302, include a tuner allowing for access to television programming. The media guidance application may have the same layout on various different types of user equipment or may be tailored to the display capabilities of the user equipment. For example, on user computer equipment 1304, the guidance application may be provided as a web site accessed by a web browser. In another example, the guidance application may be scaled down for wireless user communications devices 1306.

In system 1300, there is typically more than one of each type of user equipment device but only one of each is shown in FIG. 13 to avoid overcomplicating the drawing. In addition, each user may utilize more than one type of user equipment device and also more than one of each type of user equipment device.

In some embodiments, a user equipment device (e.g., user television equipment 1302, user computer equipment 1304, wireless user communications device 1306) may be referred to as a, "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 1314. Namely, user television equipment 1302, user computer equipment 1304, and wireless user communications device 1306 are coupled to communications network 1314 via communications paths 1308, 1310, and 1312, respectively. Communications network 1314 may be one or more networks including the Internet, a mobile phone network, mobile voice or data network (e.g., a 4G or LTE network), cable network, public switched telephone network, or other types of communications network or combinations of communications networks. Paths 1308, 1310, and 1312 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 1312 is drawn with dotted lines to indicate that in the exemplary embodiment shown in FIG. 13 it is a wireless path and paths 1308 and 1310 are drawn as solid lines to indicate they are wired paths (although these paths may be wireless paths, if desired). Communications with the user equipment devices may be provided by one or more of these communications paths, but are shown as a single path in FIG. 13 to avoid overcomplicating the drawing.

Although communications paths are not drawn between user equipment devices, these devices may communicate directly with each other via communication paths, such as those described above in connection with paths 1308, 1310, and 1312, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 1314.

System 1300 includes content source 1316 and media guidance data source 1318 coupled to communications network 1314 via communication paths 1320 and 1322, respectively. Paths 1320 and 1322 may include any of the communication paths described above in connection with paths 1308, 1310, and 1312. Communications with the content source 1316 and media guidance data source 1318 may be exchanged over one or more communications paths, but are shown as a single path in FIG. 13 to avoid overcomplicating the drawing. In addition, there may be more than one of each of content source 1316 and media guidance data source 1318, but only one of each is shown in FIG. 13 to avoid overcomplicating the drawing. (The different types of each of these sources are discussed below.) If desired, content source 1316 and media guidance data source 1318 may be integrated as one source device. Although communications between sources 1316 and 1318 with user equipment devices 1302, 1304, and 1306 are shown as through communications network 1314, in some embodiments, sources 1316 and 1318 may communicate directly with user equipment devices 1302, 1304, and 1306 via communication paths (not shown) such as those described above in connection with paths 1308, 1310, and 1312.

Content source 1316 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 1316 may be the originator of content (e.g., a television broadcaster, a Webcast provider, etc.) or may not be the originator of content (e.g., an on-demand content provider, an Internet provider of content of broadcast programs for downloading, etc.). Content source 1316 may include cable sources, satellite providers, on-demand providers, Internet providers, over-the-top content providers, or other providers of content. Content source 1316 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 1318 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 1318 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 1318 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 1318 may provide user equipment devices 1302, 1304, and 1306 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 1208, and executed by control circuitry 1204 of a user equipment device 1200. In some embodiments, media guidance applications may be client-server applications where only a client application resides on the user equipment device, and server application resides on a remote server. For example, media guidance applications may be implemented partially as a client application on control circuitry 1204 of user equipment device 1200 and partially on a remote server as a server application (e.g., media guidance data source 1318) running on control circuitry of the remote server. When executed by control circuitry of the remote server (such as media guidance data source 1318), the media guidance application may instruct the control circuitry to generate the guidance application displays and transmit the generated displays to the user equipment devices. The server application may instruct the control circuitry of the media guidance data source 1318 to transmit data for storage on the user equipment. The client application may instruct control circuitry of the receiving user equipment to generate the guidance application displays.

Content and/or media guidance data delivered to user equipment devices 1302, 1304, and 1306 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 1300 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 13.

In one approach, user equipment devices may communicate with each other within a home network. User equipment devices can communicate with each other directly via short-range point-to-point communication schemes described above, via indirect paths through a hub or other similar device provided on a home network, or via communications network 1314. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 1316 to access content. Specifically, within a home, users of user television equipment 1302 and user computer equipment 1304 may access the media guidance application to navigate among and locate desirable content. Users may also access the media guidance application outside of the home using wireless user communications devices 1306 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as, "the cloud." For example, the cloud can include a collection of server computing devices, which may be located centrally or at distributed locations, that provide cloud-based services to various types of users and devices connected via a network such as the Internet via communications network 1314. These cloud resources may include one or more content sources 1316 and one or more media guidance data sources 1318. In addition or in the alternative, the remote computing sites may include other user equipment devices, such as user television equipment 1302, user computer equipment 1304, and wireless user communications device 1306. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 1304 or wireless user communications device 1306 having content capture feature. Alternatively, the user can first transfer the content to a user equipment device, such as user computer equipment 1304. The user equipment device storing the content uploads the content to the cloud using a data transmission service on communications network 1314. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 12.

As referred herein, the term, "in response to" refers to initiated as a result of. For example, a first action being performed in response to a second action may include interstitial steps between the first action and the second action. As referred herein, the term, "directly in response to" refers to caused by. For example, a first action being performed directly in response to a second action may not include interstitial steps between the first action and the second action.

Figure 14:
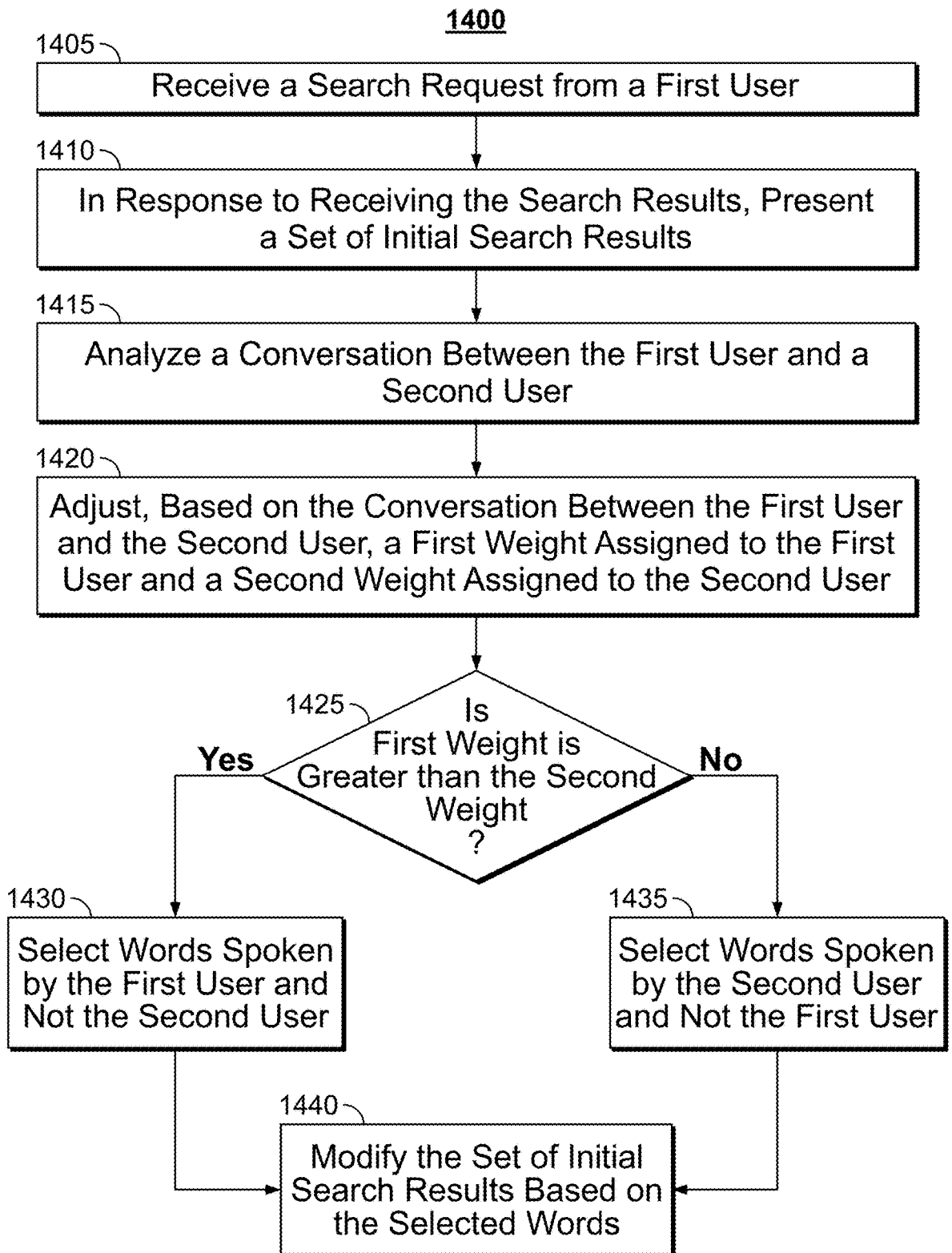
FIG. 14 is a flowchart of an illustrative process for updating search results in accordance with some embodiments of the disclosure.

FIG. 14 is a flowchart of illustrative steps of a process 1400 for updating search results based on a conversation in accordance with some embodiments of the disclosure. It should be noted that process 1400 or any step thereof could be performed on, or provided by, any of the devices shown in FIGS. 12-13. For example, process 1400 may be executed by control circuitry 1204 (FIG. 12) as instructed by a media guidance application implemented on a user device (e.g., user equipment devices 1302, 1304, and/or 1306 (FIG. 13)) to present updated search results. In addition, one or more steps of process 1400 may be incorporated into or combined with one or more steps of any other process or embodiment described herein.

FIG. 14 depicts a flowchart for a process 1400 for updating search results based on a conversation. FIG. 14 may be implemented in an environment such as that shown in FIG. 1 where media viewers may initiate a search for media that is updated according to a conversation among the viewers. The process 1400 may be performed using control circuitry 1204 for a media guidance application and a home assistant device (130 and 140 (FIG. 1)) that may be activated to listen, or which is passively listening, to the conversation among the viewers.

At step 1405, the control circuitry 1204 for the media guidance application may receive a search request from a first user. The search request may be input to the media guidance application by the first user using any suitable technique, such as entering search terms or speaking a command to search, or another technique.

At step 1410, in response to receiving the search request, the control circuitry 1204 for the media guidance application may perform a search for media assets in a database based on the search request. An initial set of search results may be presented to the viewers. The control circuitry 1204 for the media guidance application may generate a display of the initial set of search results in a display screen, such as screens 100, 120 (FIG. 1) and 200 (FIG. 2). Each of the initial set of search results may be presented in a manner such that each can be selected by a viewer to access a media item.

Upon viewing the set of search results, the viewers may discuss the search results in a conversation that may be overheard and monitored by a home assistant device (130 or 140 (FIG. 1)). At step 1415, the conversation monitored by the home assistant device (130 or 140 (FIG. 1)) may be analyzed by the control circuitry 1204 for the media guidance application. The conversation may be analyzed by the control circuitry 1204 for the media guidance application to detect comments that may be relevant to the search results and which may be useful for performing an update to the search results. The conversation may also be analyzed by the control circuitry 1204 for the media guidance application in order to detect priorities among the viewers. For example, in a conversation about the search results, one viewer may have positive or negative feedback, while another viewer may have a comment that is related to one or both of the viewer's viewing history, one viewer may make a deferential statement which may indicate that the other viewer's comments or choices should take precedence. Other elements of the conversation may also be used to determine a priority of the viewers so that the control circuitry 1204 for the media guidance application can assign a weight to the viewers to use for determining which comments by the viewers to use in updating the search results. In some scenarios, there may be one viewer that speaks about the search results. In such scenario, the media guidance application may perform a search update based on the viewer's comments.

At step 1420, the control circuitry 1204 for the media guidance application may identify some comment made by one of the viewers that may indicate priorities among the viewers, and adjust, based on the conversation between the first user and the second user, a first weight assigned to the first user and a second weight assigned to the second user. The weights for each of the users may begin at a baseline value. In some scenarios, the control circuitry 1204 for the media guidance application may search a user profile to determine a weight for the user which may be based on user history, such as frequency in making choices or searches that yield a selected media asset. In another example, parents and children may have specified settings for search controls.

At step 1425, the control circuitry 1204 for the media guidance application may determine if the first weight is greater than the second weight (or vice versa). The determination may be performed by referring to the respective weights for each user and comparing the values.

If the first weight is greater than the second weight, at step 1430, the control circuitry 1204 for the media guidance application may select words spoken by the first user and not the second user. The control circuitry 1204 for the media guidance application may select some or all comments made by the first user. If all of the comments are selected for the first user, natural language processing may be performed for an update search query at step 1440. In some scenarios, only some comments in the conversation spoken by the first user may be selected based on relevance to the search results. Those terms may be identified by the control circuitry 1204 for the media guidance application by comparing the spoken words to a database or glossary of words or a corpus of words that are generally related to media search, names of the viewers, parts of speech to identify, for example a pronoun, words associated with a viewer's user profile or viewing history, words related to the search results and associated metadata.

If the first weight is not greater than the second weight, at step 1435, the control circuitry 1204 for the media guidance application may select words spoken by the second user and not the first user. The control circuitry 1204 for the media guidance application may select some or all comments made by the second user. If all of the comments are selected for the first user, natural language processing may be performed for an update search query at step 1440. In some scenarios, only some comments in the conversation spoken by the second user may be selected based on relevance to the search results. In some scenarios, words spoken by the first user that are relevant or supportive of the search may also be used to refine the search. Such terms may be identified by the control circuitry 1204 for the media guidance application by comparing the spoken words to a database or glossary of words or a corpus of words that are generally related to media search, names of the viewers, parts of speech to identify, for example a pronoun, words associated with a viewer's user profile or viewing history, words related to the search results and associated metadata.

In an example, the initial set of search results may be modified based on the selected words of the first user. This may occur in an example where a first user and a second user discuss the initial set of search results and the second user makes a deferential comment such as, "You decide," or, "It's your turn to choose." Such comments may be analyzed by the control circuitry 1204 for the media guidance application and the pronoun, "you" or, "your" may be identified as deferring a choice to the first user (e.g., as discussed with reference to FIG. 9). The control circuitry 1204 for the media guidance application may use voice pattern information to determine which of the viewers has spoken in the conversation. User preferences for one or both of the viewers may be used to further refine the search results, for example by selecting one or more suitable search results to show in a display of the search results and in an order for ranking search results in a display of the search results.

It is contemplated that the steps or descriptions of FIG. 14 may be used with any other embodiment of this disclosure. In addition, the steps and descriptions described in relation to FIG. 14 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 12-13 could be used to perform one or more of the steps in FIG. 14.

Figure 15:
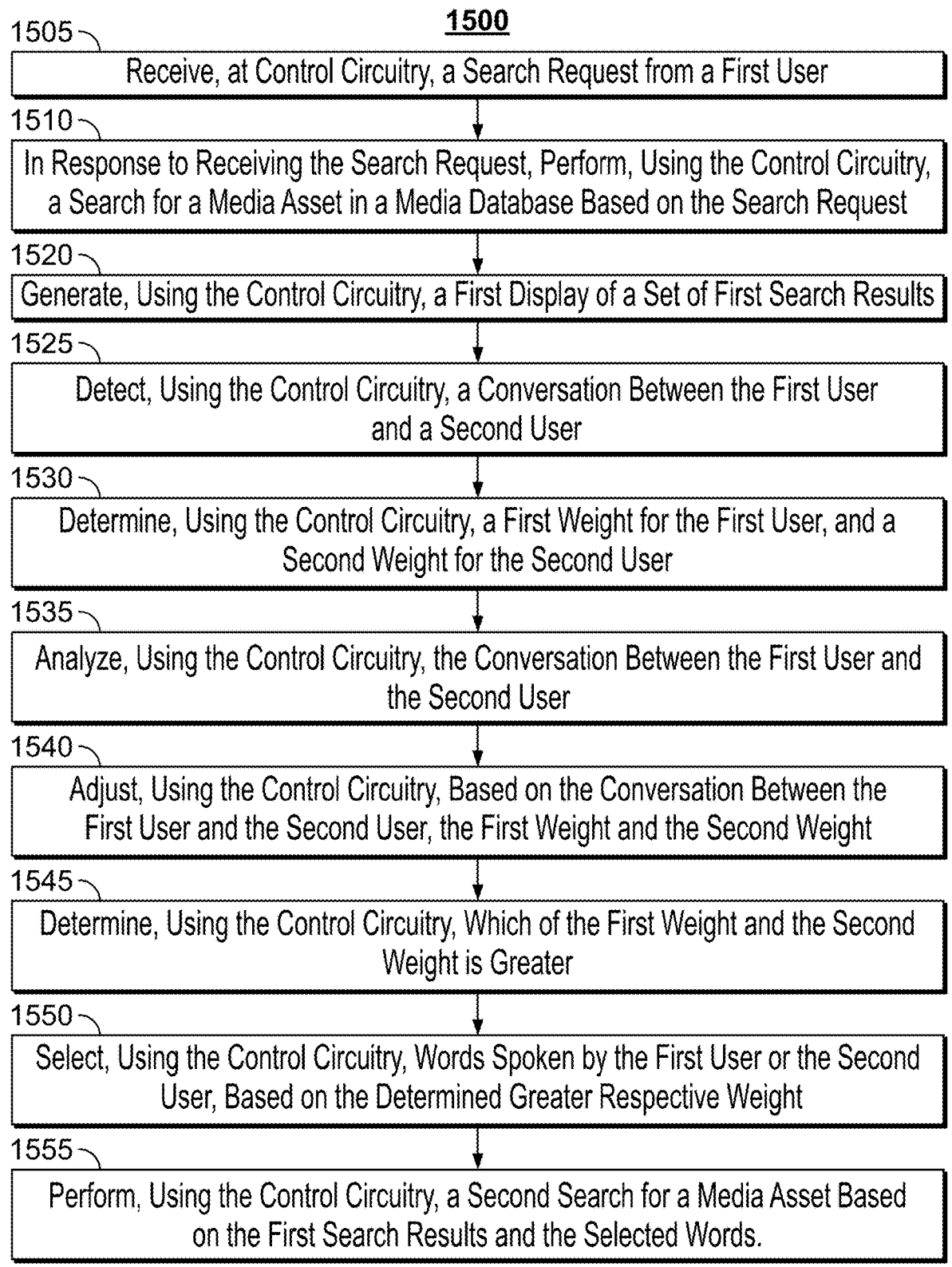
FIG. 15 is another flowchart of an illustrative process for updating search results in accordance with some embodiments of the disclosure.

FIG. 15 is another flowchart of illustrative steps of a process 1500 for updating search results based on a conversation in accordance with some embodiments of the disclosure. It should be noted that process 1500 or any step thereof could be performed on, or provided by, any of the devices shown in FIGS. 12-13. For example, process 1500 may be executed by control circuitry 1204 (FIG. 12) as instructed by a media guidance application implemented on a user device (e.g., user equipment devices 1302, 1304, and/or 1306 (FIG. 13)) to present updated search results. In addition, one or more steps of process 1500 may be incorporated into or combined with one or more steps of any other process or embodiment described herein.

FIG. 15 depicts a process 1500 for updating search results for a media asset based on a conversation. The conversation may be between more than one viewer and be about the search results for the media asset. The conversation may be analyzed to update the search results. In particular, the conversation may be analyzed to detect a priority between the viewers to determine which viewer's comments to use in updating the search results. A determination of whether the words are relevant to the search results may be performed by capturing words spoken in a conversation using the home assistant device (130 or 140 (FIG. 1)) or other audio capable device and analyzing the words using a media guidance application processor using natural language processing techniques and speech-to-text techniques to convert the conversation into text. Text corresponding to the search results, including, for example, the text of the options displayed in a screen (e.g., 200 (FIG. 2) or 300 (FIG. 3)) as well as text corresponding to metadata for each of the options displayed on the screen (e.g., 200 (FIG. 2) or 300 (FIG. 3)) may be referenced by the media guidance application and compared to the text of the conversation. Conversation text that directly matches or overlaps, or is related to a synonym of the search result text may be determined to be related to the search results. In addition to the search result text, the media guidance application may have a glossary of certain media related terms such as actor, genre, popular programming, or other terms to reference in a determination of whether comments are related to the search results. In another example, the media guidance application may search text and metadata from a user profile or viewing history to determine a relevant term. In another example, a glossary of positive and negative terminology may also be referenced by the media guidance application. The glossaries may be stored in a database accessible by the media guidance application and which may be updated with user data to improve search result quality.

In an example, one viewer's comments may be more positive, or relevant to the search results, or relevant to a viewer's viewing history. Such a viewer may be weighted relatively high. On the other hand, another viewer may be negative or make comments that are not connected to the search results or related to a viewer's viewing history. Such a viewer may be weighted relatively low. In addition, a viewer may make a comment that may indicate that another viewer's comments may be more important by way of a deferential comment.

Process 1500 may begin at step 1505 where control circuitry 1204 for a media guidance application may receive a search request from a first user. The search request may be input to the control circuitry 1204 for the media guidance application using any suitable technique such as using keywords entered in a search interface, or using an audio command, or another search technique.

The search request may be received by the control circuitry 1204 for the media guidance application, which may perform the search for a media asset in a media database. The search for the media asset may be performed using suitable search techniques and may be tailored to the user using user profile information or another factor.

The search results may be presented at step 1520 by the control circuitry 1204 for the media guidance application. The control circuitry 1204 for the media guidance application may generate a first display of a set of first search results. The list of search results may appear in a screen, such as screens 100, 120 or 200. The search results may include one or more media assets and may be shown in the display with information about the media assets. The search results may be displayed with an option to access the media asset. The search results may also be displayed with a search trail that shows the terms searched to produce the search results. The search trail may be displayed in a window with the search results or in multiple panes or picture-in-picture windows, as may be suitable for the screen on which the display is shown, so that the users can see a progression of the search and how the search terms may have affected the set of search results. A user interface for modifying the search trail to further refine a search set may be generated by the control circuitry 1204 for the media guidance application. Such user interface may be interacted with via inputs including audio commands through the home assistant or using a touch pad or remote control or other pointing device.

The display of the search results at step 1520 may lead to a discussion among the viewers about the search results and/or the basis for the latest set of search results. For example, one of the viewers or users may like one or more of the options, and may make a comment in that regard. Such a comment may affect, for example, a choice of an actor in the search set. Another viewer may make a comment agreeing with the other viewer, or say something related to the search results. At step 1525, a home assistant device (130 or 140, FIG. 1) may be used to detect a conversation between the first user and the second user. The conversation may be detected upon activation of the home assistant device (130 or 140, FIG. 1) or when using its passive listening mode. The content of the conversation may be shared with the media guidance application for analysis.

At step 1530, the control circuitry 1204 for the media guidance application may determine a first weight for the first user, and a second weight for the second user in the conversation. The weights for the respective users may be determined by the control circuitry 1204 for the media guidance application using a baseline weight. In another example, the weights for the respective users may be determined by the control circuitry 1204 for the media guidance application based on user profile information.

At step 1535, the control circuitry 1204 for the media guidance application may analyze the conversation between the first user and the second user. The analysis of the conversation may include parsing the words of the conversation. The words of the conversation may be identified by grammatical elements, such as pronouns or names. The words of the conversation may be identified as nouns that may represent categories of media or cast members. In another example, the words of the conversation may be identified to detect positive and negative words, as well as deferential terms. The conversation may also be analyzed and compared to voice pattern profiles to identify the respective speakers.

The analysis of the conversation may be used as a basis for adjusting, at step 1540, the first weight and the second weight for the first user and the second user, respectively. The adjustment may be performed by the control circuitry 1204 for the media guidance application to prioritize comments spoken by the users. The weights of each of the users may be increased or decreased based on relevance and priority of the users so that the media guidance application can update search results using comments spoken by the user having the higher weight. The weights for each respective user may be stored in a user profile by the control circuitry 1204 for the media guidance application.

At step 1545, the control circuitry 1204 for the media guidance application may determine which of the first weight and the second weight is greater. The greater of the two weights may be an indication of which user has a higher priority.

Thus, at step 1550, the control circuitry 1204 for the media guidance application may select words spoken by the first user or the second user, based on the determined greater respective weight.

At step 1555, the control circuitry 1204 for the media guidance application may perform a second search to update the initial set of search results. The second search for a media asset may be based on the first search results and the selected words. Rather than use all of the comments in the conversation by the user having the greatest weight, the control circuitry 1204 for the media guidance application may update search results using only comments made by a viewer deemed to have greater priority or weight. The words selected by the control circuitry 1204 for the media guidance application from those spoken by the user having the determined greater weight may be all of the words spoken by the user. In such case a natural language query may be performed by the control circuitry 1204 for the media guidance application together with the original search criteria for the first set of results to yield an updated set of search results. In another example, only certain comments made by the viewer having the greater weight, may be used for updating the search results. In this example, the comments may be selected when the words of the speaker are parsed and determined to have some relevance to media assets, generally, or have relevance to the initial search results and/or associated metadata for the initial search results. In some scenarios, words or comments made by the speaker having a lesser weight may be included in a search as a further filter of the search results that were based on the comments of the speaker having the greater weight to refine such search results to be relevant to both users. In some scenarios when the words or comments used from a speaker having a lesser weight are used in a search, the words selected in such search may be those that are related to the search or prior iterations of sets of search results. As sets of search results are obtained by the control circuitry 1204 for the media guidance application, each may be filtered and ranked in an order that may be based on one or both of the speakers in the conversation. In some scenarios, the control circuitry 1204 for the media guidance application may reference a database for a glossary of media related terms, such as popular movies, genres, actors, as well as positive or negative terminology that may be relevant to media search. Such database may be updated and identifiers added for the respective users to build artificial intelligence for improving search result quality.

It is contemplated that the steps or descriptions of FIG. 15 may be used with any other embodiment of this disclosure. In addition, the steps and descriptions described in relation to FIG. 15 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 12-13 could be used to perform one or more of the steps in FIG. 15.

Figure 16:
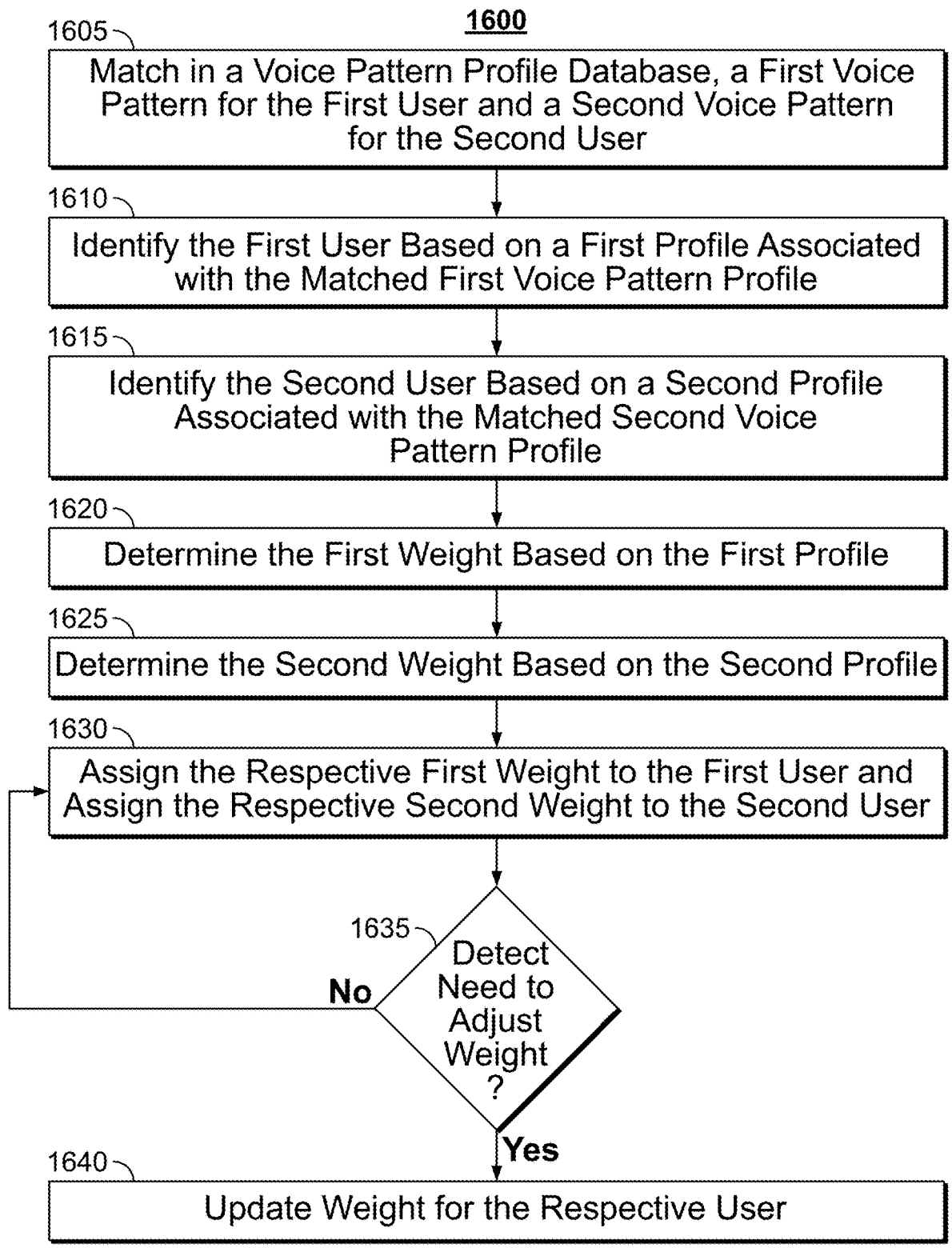
FIG. 16 is a flowchart of an illustrative process for weighting users to update search results in accordance with some embodiments of the disclosure.

FIG. 16 is a flowchart of illustrative steps of a process 1600 for weighting a viewer for updating search results based on a conversation in accordance with some embodiments of the disclosure. It should be noted that process 1600 or any step thereof could be performed on, or provided by, any of the devices shown in FIGS. 12-13. For example, process 1600 may be executed by control circuitry 1204 (FIG. 12) as instructed by a media guidance application implemented on a user device (e.g., user equipment devices 1302, 1304, and/or 1306 (FIG. 13)) to present updated search results. In addition, one or more steps of process 1600 may be incorporated into or combined with one or more steps of any other process or embodiment described herein.

A word or words from a conversation about search results may be selected based on a weight for a user or speaker of the words. Determining a weight for a user, and adjusting the user's weight may be performed according to the process 1600 depicted in the flowchart shown in FIG. 16. A home assistant device (130 or 140 (FIG. 1)) may be used to detect a conversation about search results. A voice pattern sample for each participant in the conversation may be overheard by the home assistant device (130 or 140 (FIG. 1)). At step 1605, control circuitry 1204 for a media guidance application may be used to match in a voice pattern profile database, a first voice pattern for a first user and a second voice pattern for a second user. The voice pattern profile database may include voice pattern information that may be established by a user using an audio capable device.

At step 1610, the control circuitry 1204 for the media guidance application may identify the first user based on a first profile associated with the matched first voice pattern profile. The identification of the first user based on a first profile may be performed, for example, using voice pattern matching techniques. In some scenarios, if there is no matching profile for a user, the control circuitry 1204 for the media guidance application may create a new profile for the user that may be used to build a user history and preference profile.

At step 1615, the control circuitry 1204 for the media guidance application may identify the second user based on a second profile associated with the matched second voice pattern profile. The identification of the second user based on a second profile may be performed, for example, using voice pattern matching techniques. In some scenarios, if there is no matching profile for a user, the control circuitry 1204 for the media guidance application may create a new profile for the user that may be used to build a user history and preference profile.

At step 1620, the control circuitry 1204 for the media guidance application may determine the first weight based on the first profile. The first weight may be based on a baseline number that may be changed based on user history and interactions with a media system. In the event that the user profile is new and lacks information for determining a first weight, the control circuitry 1204 for the media guidance application may establish a baseline weight for any new user.

At step 1625, the control circuitry 1204 for the media guidance application may determine the second weight based on the second profile. The second weight may be based on a baseline number that may be changed based on user history and interactions with a media system. In the event that the user profile is new and lacks information for determining a second weight, the control circuitry 1204 for the media guidance application may establish a baseline weight for any new user.

The first weight and the second weight determined at steps 1620 and 1625, respectively, may be assigned by the control circuitry 1204 for the media guidance application at step 1630 to the first user and the second user, respectively. The assignment of the weights may be made and cached so that the control circuitry 1204 for the media guidance application may keep track of prioritizing the users in the conversation.

As a conversation between the users continues, a home assistant device (130 or 140 (FIG. 1)) may be activated to listen to the conversation, or may passively listen to the conversation to identify comments that are relevant to media search results. As the home assistant device (130 or 140 (FIG. 1)) listens to the conversation, the content of the conversation may be processed and analyzed with the control circuitry 1204 for the media guidance application to detect, at step 1635, a need to adjust a weight for one of the users in the conversation. In an example, a media guidance application may detect that a conversation may include names or pronouns which may indicate that one of the users is deferring a choice to the other of the users. In another example, a media guidance application may detect that a comment by one of the users is related to the search results. In such scenarios, that user's weight may increase. In another example, a media guidance application may detect that one user's comments are positive or negative, which may cause that user's weight to change. In yet another example, a media guidance application may detect that one user's comments are related to a prior iteration of search results, and that may cause the user's weight to be changed. These and other examples are also discussed with reference to FIG. 17.

If there are no comments in the conversation that indicate that a user's weighting should be changed, then the process may return to step 1630 where a weight is assigned to a user and it remains the same. If there are comments detected that indicate that a weight of a user should be adjusted, the control circuitry 1204 for the media guidance application may update the weight for the respective user at step 1640.

It is contemplated that the steps or descriptions of FIG. 16 may be used with any other embodiment of this disclosure. In addition, the steps and descriptions described in relation to FIG. 16 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 12-13 could be used to perform one or more of the steps in FIG. 16.

Figure 17:
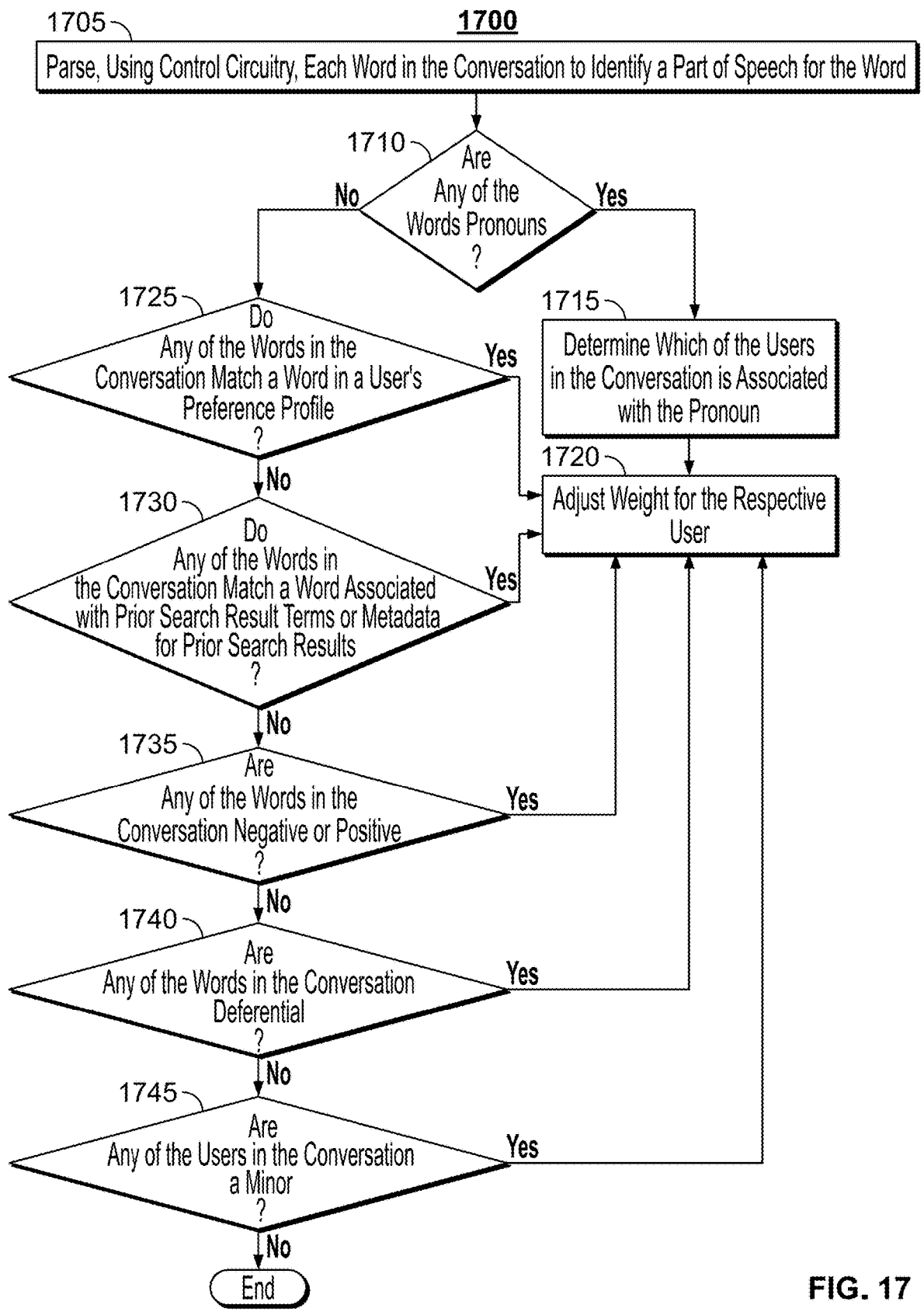
FIG. 17 is a flowchart of an illustrative process for adjusting a weight for a user to update search results in accordance with some embodiments of the disclosure.

FIG. 17 is a flowchart of illustrative steps of a process 1700 for adjusting a weight for a user for updating search results based on a conversation in accordance with some embodiments of the disclosure. It should be noted that process 1700 or any step thereof could be performed on, or provided by, any of the devices shown in FIGS. 12-13. For example, process 1700 may be executed by control circuitry 1204 (FIG. 12) as instructed by a media guidance application implemented on a user device (e.g., user equipment devices 1302, 1304, and/or 1306 (FIG. 13)) to present updated search results. In addition, one or more steps of process 1700 may be incorporated into or combined with one or more steps of any other process or embodiment described herein.

FIG. 17 depicts a process 1700 for adjusting a weight of a user. The weight of the user may be used as a basis for selecting comments by the user in a conversation about search results. The highest weighted user in the conversation may have his or her comments selected to use in updating the search results. Of course, as the conversation continues, the weighting of the users may change so that comments by one or the other user may be prioritized by a media guidance application for use in updating search results. Process 1700 may begin at step 1705 where control circuitry 1204 for the media guidance application may parse each word in the conversation to identify a part of speech for the word. The parsing and analysis of the words in the conversation may be performed using language analysis techniques, for example, using speech recognition applications, dictionaries, and other suitable resources.

At step 1710, the control circuitry 1204 for the media guidance application may determine whether any of the parsed words are pronouns. Pronouns may be identified using speech recognition techniques and a dictionary of pronouns. In addition, names for the user and user friends may be available in a user profile for the control circuitry 1204 for the media guidance application to reference. The use of a pronoun or a name of an individual in a conversation may be an indicator that one person in the conversation wishes that the other person makes a decision about the search results.

If a pronoun or name is detected in the parsed words in the conversation, at step 1715, the control circuitry 1204 for the media guidance application may determine which of the users in the conversation is associated with the pronoun or name. The determination at step 1715 may be made by referencing a user profile for name information, or by using a temporary cached profile associated with a, "user 1" and, "user 2" in a conversation.

At step 1720, the control circuitry 1204 for the media guidance application may adjust the weight for the respective user. Such weight may be stored in a user profile for reference by the control circuitry 1204 for the media guidance application.

If there are no pronouns detected in the parsed words of the conversation, the control circuitry 1204 for the media guidance application may continue to analyze the conversation terms. At step 1725, the control circuitry 1204 for the media guidance application may compare the parsed words with a user preference profile to identify a match or any overlap. If, for example, a user makes a comment such as, "I like that actor," or, "No, let's watch a comedy," such comments may match a user preference profile which may include a user history of watching comedies or media having a particular actor. In this example, since the user is making a comment about search results that also overlaps with the user's preferences, updating search results based on such comments may produce more interesting results for the user. Thus, if there are matching or overlapping comments with a user profile, the user's weight may be adjusted at step 1720.

If however, the words in the conversation do not match a user profile, the control circuitry 1204 for the media guidance application may continue analyzing the parsed words at step 1730 and determine whether any of the words in the conversation match a word associated with prior search result terms or metadata for prior search results. For example, if a user makes a comment about prior search results or actors or other metadata points about the prior search results, that user's comments may be considered to be more relevant to the search results. Accordingly, that user's weight may be adjusted at step 1720 to be relatively greater.

If however, the words in the conversation are not related to the search results or prior search results, or metadata for any of the search results, the control circuitry 1204 for the media guidance application may continue analyzing the parsed words. At step 1735, the control circuitry 1204 for the media guidance application may determine whether any of the words in the conversation negative or positive. In general, negative terms may be considered to be less helpful than positive ones. In some scenarios, however, a user may wish to establish a setting where negative terms take priority.

For example, if one user says, "No documentaries," such comment may have some priority or at least remove a subset of search results. Such comments may also be used to affect a search trail of search results that may be shown with sets of search results. If negative or positive words are detected at step 1735, the control circuitry 1204 for the media guidance application may update the respective user's weight at step 1720.

If however, the words in the conversation are not deemed to be positive or negative, the control circuitry 1204 for the media guidance application may continue analyzing the parsed words. At step 1740, the control circuitry 1204 for the media guidance application may determine whether any of the parsed terms are considered to be deferential. A shortlist of deferential terms and phrases may be referenced by the control circuitry 1204 for the media guidance application. Deferential terms or phrases may be an indicator of one user wishing to handoff a choice about a media selection to another user. Thus, if deferential terms are detected, the control circuitry 1204 for the media guidance application may adjust the weight of the other user to whom the choice may be deferred at step 1720.

If however, the terms or phrases in the conversation are not deemed to be deferential, the control circuitry 1204 for the media guidance application may continue analyzing the parsed words. At step 1745, the control circuitry 1204 for the media guidance application may determine whether any of the participants in the conversation are minors. The determination at step 1745 may include referring to a user profile, such as a family profile setting, and via use of voice pattern information. In some scenarios, a minor may be given a lesser weight at step 1720. Such weight may be established in settings so that a parent may always have priority in updating search results. In another scenario, the minor may have an associated higher weight. Such settings for a minor may be bypassed or specifically established through family control settings.

The adjusted weight at step 1720 may be used in connection with selecting terms by a certain speaker in a conversation for use in updating search results as described herein. The steps of process 1700 may be repeated as a conversation continues about iterations of media search results. The steps of process 1700 may also be performed in any order, and some steps may be optional.

It is contemplated that the steps or descriptions of FIG. 17 may be used with any other embodiment of this disclosure. In addition, the steps and descriptions described in relation to FIG. 17 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 12-13 could be used to perform one or more of the steps in FIG. 17.

Figure 18:
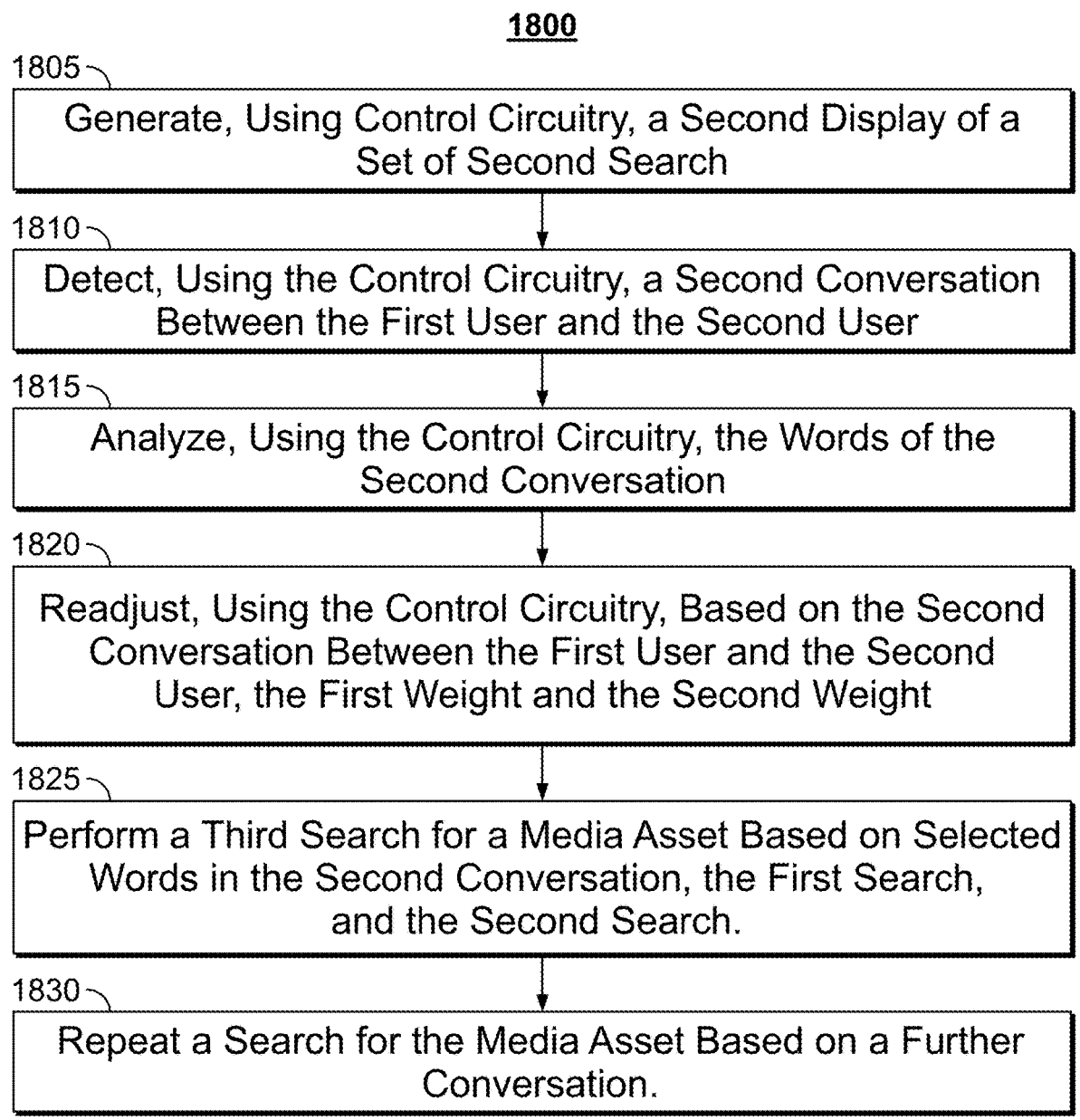
FIG. 18 is a flowchart of another illustrative process for updating search results in accordance with some embodiments of the disclosure.

FIG. 18 is a flowchart of illustrative steps of a process 1800 for updating search results based on a conversation in accordance with some embodiments of the disclosure. It should be noted that process 1800 or any step thereof could be performed on, or provided by, any of the devices shown in FIGS. 12-13. For example, process 1800 may be executed by control circuitry 1204 (FIG. 12) as instructed by a media guidance application implemented on a user device (e.g., user equipment devices 1302, 1304, and/or 1306 (FIG. 13)) to present updated search results. In addition, one or more steps of process 1800 may be incorporated into or combined with one or more steps of any other process or embodiment described herein.

Search results for a media item may be updated based on a conversation between users. The search results may be updated periodically based on the conversation, or based on conversation elements. In addition, search results may be refined based on user preference profiles and viewing history. Update settings may be selected by a user in a user profile, or a media guidance application may perform the search result updates on a benchmark schedule. FIG. 18 depicts a process 1800 that may be followed for iterating search results based on a conversation between users.

At step 1805, control circuitry 1204 for a media guidance application may be used to generate a display of an updated set of search results, in particular a second display of a set of second search results. The second search results may be generated based on a first set of search results and selected comments from a conversation between users following a first display of first search results.

At step 1810, a home assistant device (130 or 140 (FIG. 1)) may detect a second conversation between the first user and the second user that may be shared, via control circuitry, with the media guidance application. The second conversation may be about the display of second search results. The home assistant device (130 or 140 (FIG. 1)) may be activated to facilitate a search result update. The home assistant device (130 or 140 (FIG. 1)) may also be passively listening for such comments and instructions as well.

At step 1815, the control circuitry 1204 for the media guidance application may analyze the words of the second conversation. The words of the second conversation may be analyzed using language processing and speech recognition techniques. Certain words may be recognized as being significant or instructive, and a speaker of such words may be prioritized so that those words may be used to update the second search results. Significant or instructive words may be stored in a glossary and referred to by the control circuitry 1204 for the media guidance application. Some examples of instructive words and phrases can be, "more like this,", "I love that actor,", "less _____(genres)_____" or other media related phrases. In addition, a glossary of helpful media related terminology may also be built and referred to by the control circuitry 1204 for the media guidance application. Such glossary may include media categories, media metadata information, and be periodically updated to include best or most popular media information. In addition to the glossary, the control circuitry 1204 for the media guidance application may also refer to a user profile for terminology that may be important to a user. In another example, the control circuitry 1204 for the media guidance application may compare the initial search result terms and associated metadata with the conversation words to identify relevant and important words that may be suitable for updating the search results. In addition, the search results display may include a search trail which may have options that can be removed or added based on the conversation so that the users can access earlier sets of search results or bases for the search results to refine a following search. Options for saving, moving forward and backward, undoing additions and removals and other suitable options may be provided in the search results display by the media guidance application and accessed using input devices and audio cues. Options in the search trail may be activated based on the user conversations that may be monitored by a home assistant. The control circuitry 1204 for the media guidance application may reference the glossary in a database of media related terminology which may be updated with user related selections to improve the quality of the search results.

At step 1820, the control circuitry 1204 for the media guidance application may readjust, based on the second conversation between the first user and the second user, the first weight and the second weight for the respective first user and second user.

At step 1825, the control circuitry 1204 for the media guidance application may perform a third search for a media asset based on selected words from the second conversation, the first search, and the second search. The words from the second conversation may be selected based on a weight of the speaker that may have been readjusted at step 1820.

The search results may continue to be updated as a conversation continues, and as search results are updated in a display. At step 1830, the control circuitry 1204 for the media guidance application may repeat a search for the media asset based on a further conversation. Such search may also be further refined by ranking and filtering sets of search results using user preferences. In some scenarios, the ranking and filtering may be based on user preferences for a non-prioritized viewer so that the search results are presented in a manner that may be interesting and useful to both viewers.

It is contemplated that the steps or descriptions of FIG. 18 may be used with any other embodiment of this disclosure. In addition, the steps and descriptions described in relation to FIG. 18 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 12-13 could be used to perform one or more of the steps in FIG. 18.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for modifying search results for a media asset based on a conversation between users, the method comprising:

receiving, at control circuitry, a search request from a first user;

in response to receiving the search request, performing, using the control circuitry, a search for a media asset in a media database based on the search request;

generating, using the control circuitry, a first display of a set of first search results;

detecting, using the control circuitry, a conversation between the first user and a second user;

analyzing, using the control circuitry, the conversation between the first user and the second user;

selecting, using the control circuitry, words spoken by the first user or the second user, based on a respective weight assigned to each of the first user and the second user; and updating, using the control circuitry, the first search results based on the selected words.

2. The method of claim 1, wherein selecting, using the control circuitry, words spoken by the first user or the second user, based on the respective weight assigned to each of the first user and the second user comprises:

determining, using the control circuitry, a first weight for the first user, and a second weight for the second user;

adjusting, using the control circuitry, based on the conversation between the first user and the second user, the first weight and the second weight;

determining, using the control circuitry, which of the first weight and the second weight is greater; and selecting, using the control circuitry, words spoken by the first user or the second user, based on the determined greater respective weight.

3. The method of claim 2, wherein determining, using the control circuitry, the first weight for the first user, and the second weight for the second user comprises:

matching in a voice pattern profile database, a first voice pattern for the first user and a second voice pattern for the second user;

identifying the first user based on a first profile associated with the matched first voice pattern profile;

identifying the second user based on a second profile associated with the matched second voice pattern profile;

determining the first weight based on the first profile; and determining the second weight based on the second profile.

4. The method of claim 3, further comprising:

comparing, using the control circuitry, words spoken in the conversation between the first user and the second user with a preference profile for the first user and the second user;

detecting, using the control circuitry, a match between a word spoken in the conversation and a preference profile for the first user or the second user; and increasing the respective weight for the first user or the second user based on a matching word.

5. The method of claim 1, wherein analyzing, using the control circuitry, the conversation between the first user and the second user, further comprises:

parsing each word in the conversation to identify a part of speech for the word;

detecting, among the parsed words in the conversation, a pronoun;

determining which of the first user and the second user is associated with the pronoun; and adjusting the respective weight for the first user or the second user based on the determination of association with the pronoun.

6. The method of claim 1, wherein analyzing, using the control circuitry, the conversation between the first user and the second user further comprises:

comparing each word in the conversation with terms of the first search results and metadata associated with the first search results;

determining a matching word among the compared words in the conversation and the terms of the first search results and metadata associated with the first search results;

determining which of the first user or the second user spoke the matching word, based on a respective voice profile; and adjusting the first weight or the second weight, based on the determined speaker of the matching word.

7. The method of claim 1, wherein analyzing, using the control circuitry, the conversation between the first user and the second user, further comprises:

parsing each word in the conversation to identify a negative or a positive word;

for an identified negative word in the conversation; determining which of the first user or the second user spoke the identified negative word, based on a respective voice profile; and adjusting the respective weight for the determined speaker of the identified negative word.

8. The method of claim 1, further comprising:

generating, using the control circuitry, a second display of a set of updated search results;

detecting, using the control circuitry, a second conversation between the first user and the second user;

analyzing, using the control circuitry, the words of the second conversation;

readjusting, using the control circuitry, based on the second conversation between the first user and the second user, the first weight and the second weight; and updating the set of second search results based on selected words in the second conversation.

9. The method of claim 8, further comprising:

ranking, using the control circuitry, the updated set of second search results in an order ranked based on a preference profile for the first user or the second user.

10. The method of claim 1, further comprising:

initiating, using the control circuitry, a home assistant device to monitor the conversation between the first user and the second user for a period, wherein the home assistant device is selected based on its proximity to the display of the first search results and proximity to the first user and the second user.

11. A system for modifying search results for a media asset based on a conversation between users, the system comprising:

input/output (I/O) interface circuitry configured to:
receive a search request from a first user; and
receive a conversation between the first user and a second user; and control circuitry configured to:
in response to receiving the search request, perform a search for a media asset in a media database based on the search request;
generate a first display of a set of first search results;
analyze the conversation between the first user and the second user;
select words spoken by the first user or the second user, based on a respective weight assigned to each of the first user and the second user; and
update the first search results based on the selected words.

12. The system of claim 11, wherein the control circuitry is configured to select words spoken by the first user or the second user, based on the respective weight assigned to each of the first user and the second user by:

determining a first weight for the first user, and a second weight for the second user;

adjusting, based on the conversation between the first user and the second user, the first weight and the second weight;

determining which of the first weight and the second weight is greater; and selecting words spoken by the first user or the second user, based on the determined greater respective weight.

13. The system of claim 12, wherein the control circuitry is configured to determine the first weight for the first user, and the second weight for the second user by:

matching in a voice pattern profile database, a first voice pattern for the first user and a second voice pattern for the second user;

identifying the first user based on a first profile associated with the matched first voice pattern profile;

identifying the second user based on a second profile associated with the matched second voice pattern profile;

determining the first weight based on the first profile; and determining the second weight based on the second profile.

14. The system of claim 13, wherein the control circuitry is further configured to:

compare words spoken in the conversation between the first user and the second user with a preference profile for the first user and the second user;

detect a match between a word spoken in the conversation and a preference profile for the first user or the second user; and increase the respective weight for the first user or the second user based on a matching word.

15. The system of claim 11, wherein the control circuitry is configured to analyze the conversation between the first user and the second user by:

parsing each word in the conversation to identify a part of speech for the word;

detecting, among the parsed words in the conversation, a pronoun;

determining which of the first user and the second user is associated with the pronoun; and adjusting the respective weight for the first user or the second user based on the determination of association with the pronoun.

16. The system of claim 11, wherein the control circuitry is configured to analyze the conversation between the first user and the second user by:

comparing each word in the conversation with terms of the first search results and metadata associated with the first search results;

determining a matching word among the compared words in the conversation and the terms of the first search results and metadata associated with the first search results;

determining which of the first user or the second user spoke the matching word, based on a respective voice profile; and adjusting the first weight or the second weight, based on the determined speaker of the matching word.

17. The system of claim 11, wherein the control circuitry is configured to analyze the conversation between the first user and the second user by:

parsing each word in the conversation to identify a negative or a positive word;

for an identified negative word in the conversation; determining which of the first user or the second user spoke the identified negative word, based on a respective voice profile; and adjusting the respective weight for the determined speaker of the identified negative word.

18. The system of claim 11, wherein the control circuitry is further configured to:

generate a second display of a set of updated search results;

detect a second conversation between the first user and the second user;

analyze the words of the second conversation;

readjust, based on the second conversation between the first user and the second user, the first weight and the second weight; and update the set of second search results based on selected words in the second conversation.

19. The system of claim 18, wherein the control circuitry is further configured to:

rank the updated set of second search results in an order ranked based on a preference profile for the first user or the second user.

20. The system of claim 11, wherein the control circuitry is further configured to:

initiate a home assistant device to monitor the conversation between the first user and the second user for a period, wherein the home assistant device is selected based on its proximity to the display of the first search results and proximity to the first user and the second user.

* * * * *